United States Patent
Ishino

(10) Patent No.: US 10,511,244 B2
(45) Date of Patent: Dec. 17, 2019

(54) MOTOR CONTROL DEVICE AND MOTOR SYSTEM

(71) Applicant: Renesas Electronics Corporation, Tokyo (JP)

(72) Inventor: Takahito Ishino, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

(21) Appl. No.: 16/054,115

(22) Filed: Aug. 3, 2018

(65) Prior Publication Data

US 2019/0115859 A1 Apr. 18, 2019

(30) Foreign Application Priority Data

Oct. 13, 2017 (JP) ................. 2017-199350

(51) Int. Cl.
| | | |
|---|---|---|
| *G01R 31/02* | (2006.01) | |
| *H02H 3/04* | (2006.01) | |
| *H02H 7/08* | (2006.01) | |
| *H02P 21/16* | (2016.01) | |
| *H02P 21/18* | (2016.01) | |
| *H02P 27/08* | (2006.01) | |
| *H02P 25/026* | (2016.01) | |
| *H02P 21/22* | (2016.01) | |
| *H02P 6/185* | (2016.01) | |

(52) U.S. Cl.
CPC .............. *H02P 21/16* (2016.02); *H02P 6/185* (2013.01); *H02P 21/18* (2016.02); *H02P 21/22* (2016.02); *H02P 25/026* (2013.01); *H02P 27/085* (2013.01)

(58) Field of Classification Search
CPC ................................. H02P 21/16; H02P 21/18
USPC ......................................................... 318/490
See application file for complete search history.

(56) References Cited

U.S. PATENT DOCUMENTS

| 8,344,680 B2* | 1/2013 | Kitanaka ................. H02P 21/06 318/400.01 |
| 9,419,553 B2* | 8/2016 | Nakai ....................... H02P 21/05 |
| 9,438,156 B2* | 9/2016 | Kato .................... H02P 21/0017 |

FOREIGN PATENT DOCUMENTS

JP 2008-182881 A 8/2008

* cited by examiner

*Primary Examiner* — Erick D Glass
(74) *Attorney, Agent, or Firm* — Mattingly & Malur, PC

(57) ABSTRACT

To improve identification precision of a motor constant that controls a motor by vector control. A parameter identifier sets an offset voltage of a DC component as a first d-axis target voltage, and detects a d-axis current that flows accordingly as an offset current. The parameter identifier also sets a voltage obtained by superimposing an identification signal of a predetermined AC component on the first d-axis target voltage as a second d-axis target voltage, and detects the d-axis current that flow accordingly. The parameter identifier then identifies the motor constant using a voltage obtained by subtracting the first d-axis target voltage from the second d-axis target voltage and a current obtained by subtracting the offset current from the d-axis current as inputs.

15 Claims, 17 Drawing Sheets

MOTOR CONTROL DEVICE AND MOTOR SYSTEM

CROSS-REFERENCE TO RELATED APPLICATIONS

The disclosure of Japanese Patent Application No. 2017-199350 filed on Oct. 13, 2017 including the specification, drawings and abstract is incorporated herein by reference in its entirety.

BACKGROUND

The present invention relates to a motor control device and a motor system, and specifically to, for example, a motor constant identification technology.

Japanese Unexamined Patent Application Publication No. 2008-182881 discloses a control device that identifies a motor constant of a synchronous motor. The control device firstly sets a direct current instruction on a d axis to fix a position of a rotor in the synchronous motor. Next, the control device provides a current control means with a current instruction including a deviation between the direct current instruction and a detected current superimposed by an identification signal for identifying the motor constant. The control device then identifies the motor constant by the recursive least squares method using a voltage instruction output from the current control means and the detected current.

SUMMARY

For example, a sensorless synchronous motor obtains information equivalent to the information obtained by a sensor by performing a predetermined computation using various types of instruction information and various types of detection information. Such a computation often requires a motor constant such as a resistance component and an inductance component of the motor. Therefore, it is conceivable, for example, to identify the motor constant using such a method as disclosed in Japanese Unexamined Patent Application Publication No. 2008-182881. However, the method disclosed in Japanese Unexamined Patent Application Publication No. 2008-182881 involves a risk of reducing identification precision of the motor constant due to an error between the voltage instruction output from the current control means and an actual drive voltage applied to the motor.

Embodiments to be described later are made in view of such an issue, and other problems and novel features will become apparent from the description of the present application and accompanying drawings.

A motor control device according to an embodiment includes a PWM signal generator, a current detector, and an identifier, and controls a motor by vector control. The PWM signal generator generates a PWM signal for each phase of the motor based on a d-axis target voltage and a q-axis target voltage. The current detector detects each phase current of the motor and detects a d-axis current and a q-axis current of the motor based on the corresponding phase current. The identifier identifies the motor constant of the motor by performing the first to fifth processings. The identifier sets an offset voltage of a DC component as a first d-axis target voltage (first processing), and detects the d-axis current that flows accordingly as an offset current (second processing). Moreover, the identifier sets a voltage calculated by superimposing an identification signal of a predetermined AC component on the first d-axis target voltage as a second d-axis target voltage (third processing), and detects the d-axis current that flows accordingly (fourth processing). The identifier then identifies the motor constant by a predetermined identification algorithm using a voltage obtained by subtracting the first d-axis target voltage from the second d-axis target voltage and a current obtained by subtracting the offset current from the d-axis current detected in the fourth processing as inputs (fifth processing).

According to the embodiment, it is possible to improve the identification precision of the motor constant in the motor control device that controls a motor by the vector control.

DETAILED DESCRIPTION

Figure 1:
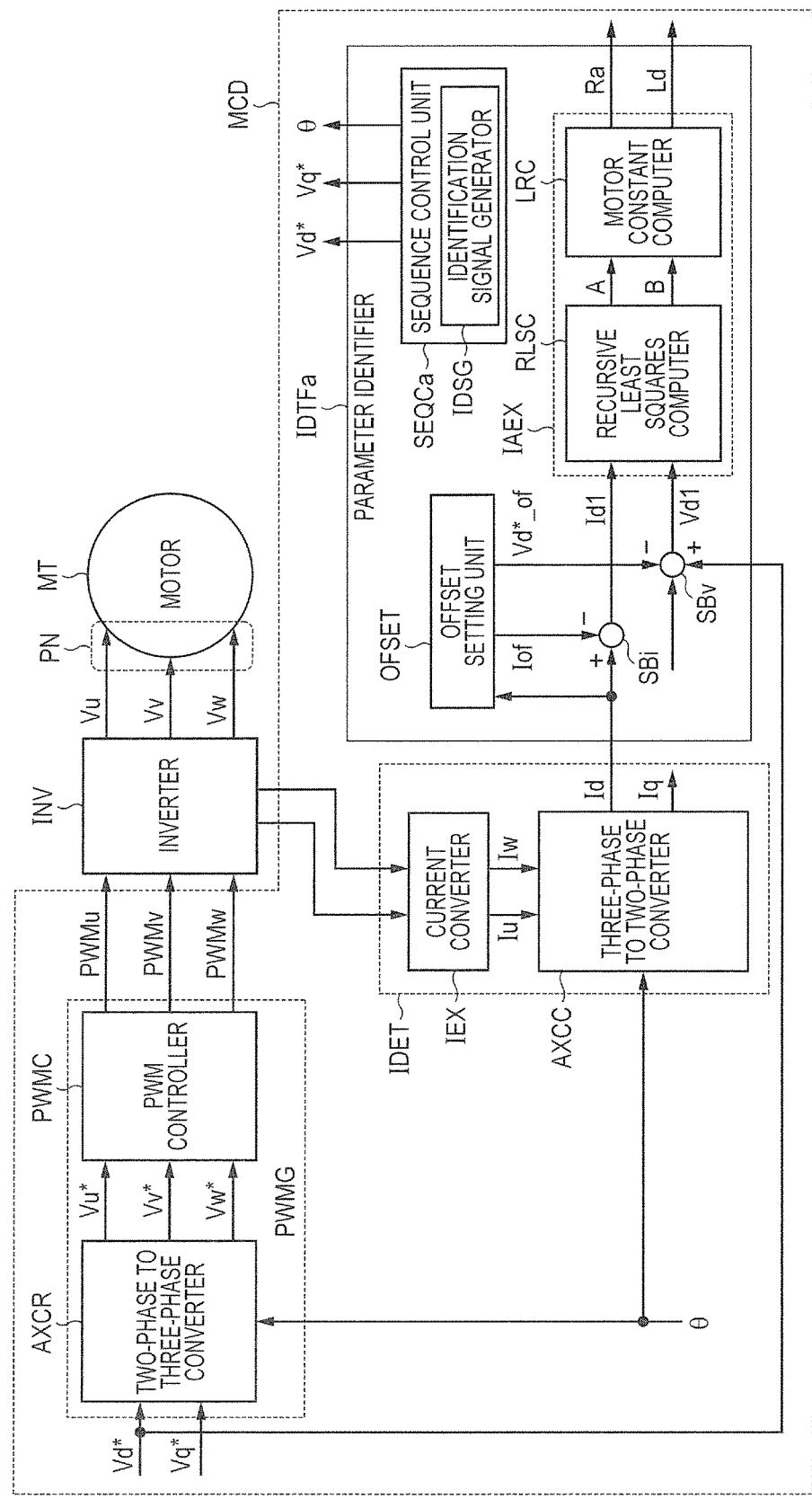
FIG. 1 is an outline diagram showing an example configuration of a motor system according to a first embodiment of the invention.

In the following embodiments, although explanation is given with respect to each section or each embodiment as needed for convenience, the sections or embodiments are not irrelevant to each other but one may be a part or all of a modification, detailed description, or supplementary explanation of another, unless otherwise specified. Moreover, in the following embodiments, when a number (including number of pieces, numerical value, amount, range and the like) of an element is referenced, it is not limited to the specific number but may be more or less than the specific number, unless otherwise specified or explicitly limited to the specific number in principle.

Furthermore, in the following embodiments, it is needless to say that components (including element steps) are not necessarily essential unless otherwise specified or explicitly essential in principle. Similarly, in the following embodiments, when a shape, positional relationship, or the like of the component is referenced, it includes substantially approximate or similar shape or the like unless otherwise specified or explicitly inapplicable in principle. This also applies to the numerical values and ranges described above.

Embodiments of the invention will be described below in detail with reference to drawings. It is to be noted that like reference numerals designate like parts in principle throughout the figures for illustrating the embodiments and the description thereof is not repeated.

First Embodiment

<<Configuration of Motor System>>

Figure 2:
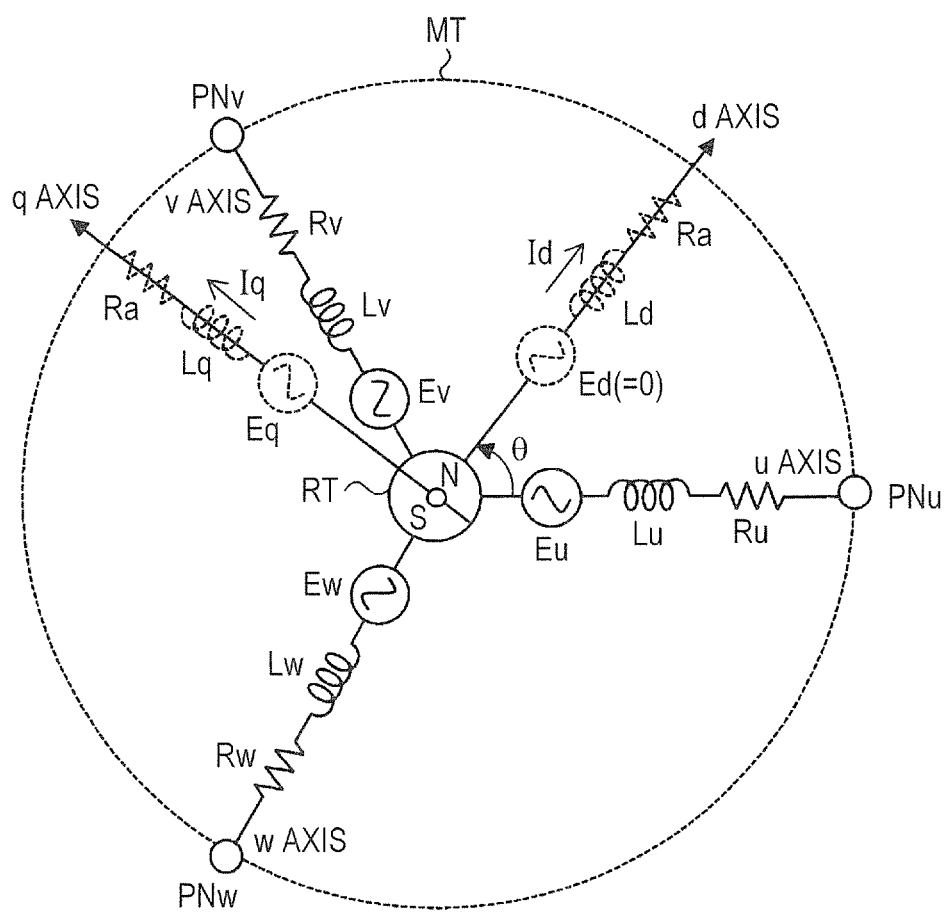
FIG. 2 is a schematic diagram showing an example configuration and coordinate axes of the motor shown in FIG. 1.

FIG. 1 is an outline diagram showing an example configuration of a motor system according to a first embodiment of the invention. FIG. 2 is a schematic diagram showing an example configuration and coordinate axes of the motor shown in FIG. 1. The motor system shown in FIG. 1 includes a motor control device MCD, an inverter INV, and a motor MT. The motor MT is, for example, a three-phase (u phase, v phase, w phase) synchronous motor (in other words, brushless DC motor).

The motor MT specifically includes, as shown in FIG. 2, external terminals of three phases PNu, PNv, PNw and a rotor RT that is a permanent magnet, and may be represented by an equivalent circuit including a stator. Based on three-phase axes (u axis, v axis, w axis) serving as fixed coordinates, the motor MT is represented by resistance components Ru, Rv, Rw, inductance components Lu, Lv, Lw, and induced voltages Eu, Ev, Ew of the three phases. Taking the u phase as an example, the resistance component Ru, the inductance component Lu, and the induced voltage Eu are coupled in series between a midpoint and the u-phase external terminal PNu, the midpoint being the rotor RT. The u axis, the v axis, and the w axis are arranged in energizing directions (current direction) of the u phase, the v phase, and the w phase, respectively, and spaced in the order at an electrical angle of 120° with respect to a rotating direction of the rotor RT.

On the other hand, the fixed coordinates (three-phase axes) can be converted into two-phase axes (d axis, q axis) serving as the rotating coordinate. The d axis is arranged in a magnetic flux direction of the rotor RT, and the q axis is arranged in a direction perpendicular to the d axis. A rotation angle θ generally indicates an angle between the u axis and the d axis, which serves as information indicative of positional relation between the three phases (u phase, v phase, w phase) and the rotor RT. Based on the two-phase axes serving as the rotating coordinates, the motor MT can be represented by the resistance component Ra, the d-axis inductance component Ld and the q-axis inductance component Lq, and the d-axis induced voltage Ed and the q-axis induced voltage Eq. However, the d-axis induced voltage Ed is zero. When a current in the q-axis direction (q-axis current Iq) is applied by vector synthesis of three-phase current, torque is generated in the rotating direction of the rotor RT based on Fleming's law. On the other hand, a current in the d-axis direction (d-axis current Id) does not generally contribute to the torque.

There are known as structures of the motor MT (specifically, rotor RT) an SPM (Surface Permanent Magnet) structure (non-salient structure) in which Lq=Ld and an IPM (Interior Permanent Magnet) structure (salient structure) in which Lq≠Ld. Although the motor MT has the SPM structure in the first embodiment, it may also have the IPM structure. In a case of the IPM structure, torque (reactance torque) is also generated by the d-axis current Id. Moreover, the resistance component Ra presents the same value on the d axis and the q axis regardless of the SPM structure or the IPM structure.

Returning to FIG. 1, the inverter INV functions as a motor driver, and applies a drive voltages Vu, Vv, Vw based on PWM (Pulse Width Modulation) signals PWMu, PWMv, PWMw to the external terminals of three phases PN (u, v, w) of the motor MT, respectively. The inverter INV includes, though not shown in the figure, high side switching elements of the three phases arranged between the external terminals of the three phases PN (u, v, w) and a high-potential-side power supply voltage, respectively, and low side switching elements of the three phases arranged between the external terminals of the three phases PN (u, v, w) and a low-potential-side power supply voltage, respectively.

The motor control device MCD includes, for example, a microcontroller incorporating a processor, an A/D converter, a PWM signal generator, and the like, and controls the motor MT by vector control. The motor control device MCD includes a two-phase to three-phase converter AXCR, a PWM controller PWMC, a current converter IEX, a three-phase to two-phase converter AXCC, and a parameter identifier IDTFa. The two-phase to three-phase converter AXCR and the PWM controller PWMC function as a PWM signal generator PWMG that generates a PWM signal based on d-axis target voltage Vd* and a q-axis target voltage Vq*. The d-axis target voltage Vd* and the q-axis target voltage Vq* are sequentially set with respect to each predetermined control cycle (such as 10 kHz).

The two-phase to three-phase converter AXCR performs conversion from the rotating coordinate (dq coordinate) to the fixed coordinate (u, v, w coordinate) based on the rotation angle θ, and converts the d-axis target voltage Vd* and the q-axis target voltage Vq* to a u-phase target voltage Vu*, a v-phase target voltage Vv*, and a w-phase target voltage Vw*. The PWM controller PWMC determines duty ratios of the three phases for generating the target voltages of the three phases (Vu*, Vv*, Vw*), respectively, and generates PWM signals PWMu, PWMv, PWMw having the duty ratios of the three phases, respectively.

The current converter IEX and the three-phase to two-phase converter AXCC function as a current detector IDET that sequentially detects each phase current of the motor MT with respect to each predetermined control cycle (such as 10 kHz) and detects the d-axis current Id and the q-axis current Iq based on each corresponding phase current. The current converter IEX detects current in two phases out of the three phases flowing in the inverter INV (u-phase current Iu and w-phase current Iw in this example) using the A/D converter. After obtaining the current in the two phases, the current in the remaining phase can be obtained by computation.

Various methods can be applied here as specific methods of current detection. Typical example would include three-shunt method of detecting the three-phase current by inserting a shunt resistor in the low side of each phase of the inverter INV and one-shunt method of detecting the three-phase current by inserting one shunt resistor in the low-potential-side power supply voltage of the inverter INV and devising the sampling timing. The shunt resistor functions as a current sensor. The current converter IEX detects current on a fixed axis (such as u-phase current Iu and w-phase current Iw) based on the end voltage of the shunt resistor. The three-phase to two-phase converter AXCC detects the current on the rotation axis by performing conversion from the fixed coordinate (u, v, w coordinate) to the rotating coordinate (dq coordinate) based on the rotation angle θ and converting coordinates of the current from the current converter IEX on the fixed axis.

The parameter identifier IDTFa includes an offset setting unit OFSET, subtractors SBi, SBv, an identification algorithm execution unit IAEX, and a sequence control unit SEQCa, and identifies the motor constant of the motor MT. The offset setting unit OFSET outputs, though details thereof will be described later, an offset current Iof and an offset voltage Vd*_of recorded in advance. The subtractor SBi subtracts the offset current Iof from the d-axis current Id received from the three-phase to two-phase converter AXCC, and the subtractor SBv subtracts the offset voltage Vd*_of from the d-axis target voltage Vd*.

The identification algorithm execution unit IAEX includes a recursive least squares computer RLSC and a motor constant computer LRC, and identifies the motor constant of the motor MT with a predetermined identification algorithm using a current Id1 obtained by the subtractor SBi and a voltage Vd1 obtained by the subtractor SBv as inputs. Although the recursive least squares method (RLS (Recursive Least Square) method) that is one of linear regression analyses and allows for obtaining fast convergence time is used herein, the identification algorithm is not limited thereto.

The recursive least squares computer RLSC generally estimates the present current by reflecting predetermined parameters A, B to the current Id1 and the voltage Vd1 in the previous control cycle, and updates the parameters A, B so that an error between the estimated current and the current Id1 in the present control cycle is brought closer to zero. The motor constant computer LRC calculates the motor constant (herein, the resistance component Ra and the d-axis inductance component Ld of the motor MT) from the parameters A, B using a predetermined relational expression.

The sequence control unit SEQCa controls various sequences of identifying the motor constant by the parameter identifier IDTFa. In the sequence, the sequence control unit SEQCa appropriately generates the d-axis target voltage Vd*, the q-axis target voltage Vq*, and the rotation angle θ. Moreover, the sequence control unit SEQCa includes an identification signal generator IDSG for generating the identification signal required for identifying the motor constant. The identification signal is a sinusoidal signal, for example, but it may be a pseudo random signal in some cases.

Although each portion constituting the motor control device MCD is mainly configured by program manipulation by the microcontroller in this example, it is not limited to this example but a part or all of the portions may be configured by dedicated hardware.

<<Details of Parameter Identifier>>

Figure 3:
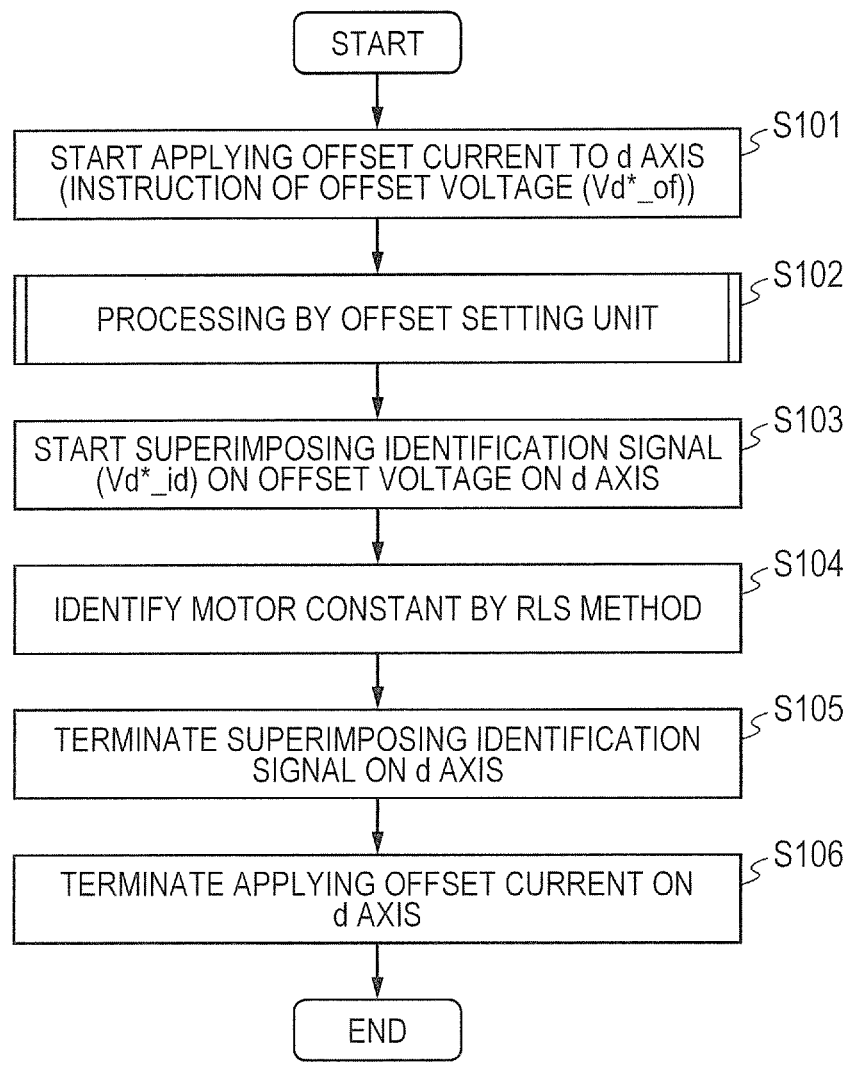
FIG. 3 is a flow diagram showing an example of processing details of a sequence control unit in a parameter identifier shown in FIG. 1.
Figure 4:
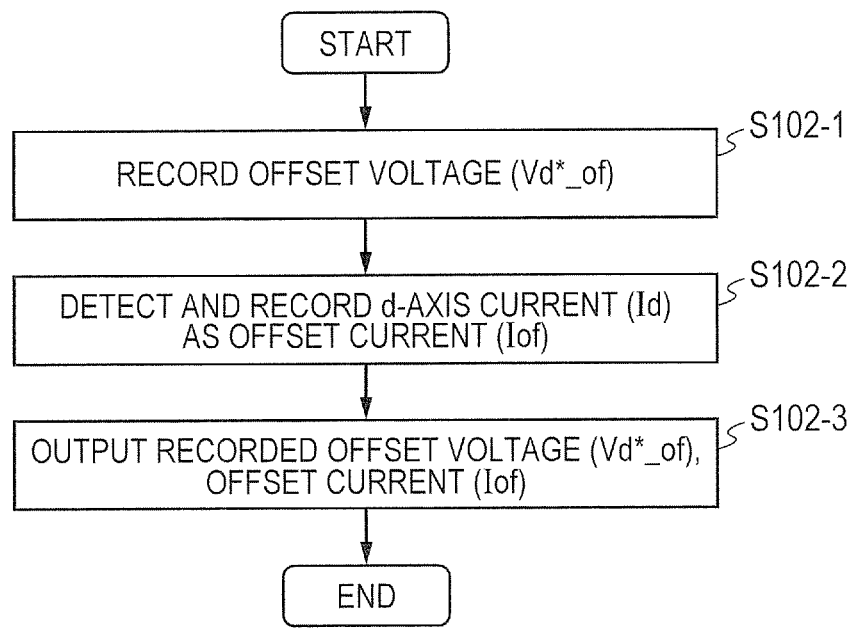
FIG. 4 is a flow diagram showing an example of processing details of an offset setting unit shown in FIG. 3.

FIG. 3 is a flow diagram showing an example of processing details of the sequence control unit in the parameter identifier shown in FIG. 1. FIG. 4 is a flow diagram showing an example of processing details of the offset setting unit shown in FIG. 3. In FIG. 3, primarily to fix the rotor RT to a predetermined location on the fixed coordinate, the sequence control unit SEQCa sets the offset voltage Vd*_of of the DC component as the d-axis target voltage Vd*, sets the q-axis target voltage Vq* to zero, and sets the rotation angle θ, for example, zero (Step S101). The PWM signal generator PWMG in FIG. 1 applies the drive voltage to the motor MT via the inverter INC in accordance with the d-axis target voltage Vd* (offset voltage Vd*_of), and applies the d-axis current Id to the d axis of the motor MT as the offset current. As a result, when the rotation angle θ is zero, the d axis of the rotor RT is drawn to the u axis and fixed on the u axis.

Next, the sequence control unit SEQCa has the offset setting unit OFSET perform the processing shown in FIG. 4 (Step S102). In FIG. 4, the offset setting unit OFSET records the offset voltage Vd*_of set by the sequence control unit SEQCa (Step S102-1). Moreover, the offset setting unit OFSET detects and records the d-axis current Id of the motor MT flowing in accordance with the setting of the d-axis target voltage Vd* (offset voltage Vd*_of) described above as the offset current Iof (Step S102-2). The offset setting unit OFSET then outputs the recorded offset voltage Vd*_of and the offset current Iof to the subtractor SBv and the subtractor SBi, respectively (Step S102-3).

Returning to FIG. 3, the sequence control unit SEQCa sets the above-mentioned d-axis target voltage Vd* (offset voltage Vd*_of) superimposed by a predetermined identification signal Vd*_id of the AC component as the d-axis target voltage Vd* (Step S103). That is, in order to apply the identification signal Vd*_id to the motor MT in a state where the rotor RT is at rest, superimposition of the offset voltage Vd*_of and the identification signal Vd*_id is performed. The identification signal Vd*_id is, for example, a sinusoidal signal having a wavelength in a range of 100 Hz to 200 Hz. The sequence control unit SEQCa sequentially updates the d-axis target voltage Vd* with respect to each predetermined control cycle so as to form such a superimposed signal. The PWM signal generator PWMG applies the drive voltage to the motor MT via the inverter INV and applies the superimposed signal to the d axis of the motor MT in accordance with the d-axis target voltage Vd*.

Because the value of the offset voltage Vd*_of and the amplitude value of the identification signal Vd*_id vary depending on the characteristics of the motor MT, it is desirable in practice to specify these values before Step S101, though not shown in the figure. Specifically, the parameter identifier IDTFa firstly refers to a rated current effective value Irat of the motor MT set by a user in advance. In a case where the rated current effective value Irat is equal to or lower than the maximum current allowed for the inverter INV in FIG. 1 and its mount board, for example, the parameter identifier IDTFa specifies such a reference current as represented by Equations (1) and (2).

$$Iref1 = k1 \times Irat \text{ (e.g. } 0.4 \leq k1 \leq 0.8) \tag{1}$$

$$Iref2 = k2 \times Irat \text{ (e.g. } k1 < k2 \leq 0.9) \tag{2}$$

The parameter identifier IDTFa gradually increases the d-axis target voltage Vd* until the d-axis current Id detected by the current detector IDET reaches a predetermined reference current Iref1, and specifies the d-axis target voltage Vd* at the time of reaching the reference current Iref1 as the value of the offset voltage Vd*_of. Subsequently, the parameter identifier IDTFa gradually increases the d-axis target voltage Vd* until the d-axis current Id detected by the current detector IDET reaches a predetermined reference current Iref2, and specifies the d-axis target voltage Vd* at the time of reaching the reference current Iref2 as the maximum value of the above-mentioned superimposed signal (offset voltage Vd*_of+identification signal Vd*_id). That is, the parameter identifier IDTFa specifies a differential value between the voltage determined on the basis of Equation (2) and the voltage determined on the basis of Equation (1) as the amplitude value of the identification signal Vd*_id.

Now, the relation between the voltage and the current of the motor MT is not known in the initial state and, if a voltage is applied to the motor MT in a stopped state (i.e. in a state where the induced voltage is zero) at Step S101 in FIG. 3, high current exceeding the rated current effective value Irat may flow to damage the motor MT. Thus, by specifying the reference currents Iref1, Iref2 lower than the rated current effective value Irat and searching for the corresponding d-axis target voltage Vd* while gradually increasing the current, it is possible to secure safety of the motor MT when specifying the size of the superimposed signal.

Furthermore, it is also possible to secure safety of the motor MT when the superimposed signal determined in this manner is applied to the motor MT at Step S103 in FIG. 3. That is, impedance of the motor MT at Step S103 in FIG. 3 (in other words, during AC operation) increases along with the inductance component compared to when specifying the size of the above-mentioned superimposed signal (in other words, during DC operation). Accordingly, the maximum value of the d-axis current Id flowing through the motor MT at Step S103 in FIG. 3 is smaller than the reference current Iref2 obtained by Equation (2), thereby sufficiently securing safety of the motor MT.

It is to be noted that, when the offset voltage Vd*_of (offset current) is too low, fixation of the rotor RT may be insufficient and the identification precision may be degraded. Moreover, when the amplitude of the identification signal Vd*_id is too small, relative error in current detection with respect to the amplitude may increase, which may possibly cause degradation of the identification precision. Accordingly, as a specific example, a coefficient k1 of Equation (1) is set to 0.5 and a coefficient k2 of Equation (2) is set to 0.75.

After Step S103 in FIG. 3, the sequence control unit SEQCa identifies the motor constant by the recursive least squares method (RLS method) (Step S104). Specifically, the sequence control unit SEQCa detects the d-axis current Id that flows accompanying the setting of the superimposed signal at Step S103 with respect to each control cycle using the current detector IDET. Moreover, the sequence control unit SEQCa outputs the d-axis target voltage Vd* accompanying the setting of the superimposed signal at Step S103 to the subtractor SBv with respect to each predetermined control cycle. As a result, the identification algorithm execution unit IAEX identifies the motor constant by the RLS method using the voltage Vd1 obtained by subtracting the offset voltage Vd*_of from the d-axis target voltage Vd* and the current Id1 obtained by subtracting the offset current Iof from the d-axis current Id as inputs.

When identification of the motor constant is completed, the sequence control unit SEQCa terminates superimposition of the identification signal Vd*_id to the d axis (Step S105), and terminates application of the offset voltage (offset current) to the d axis (Step S106).

<<Details of Identification Algorithm Execution Unit>>

Figure 5:
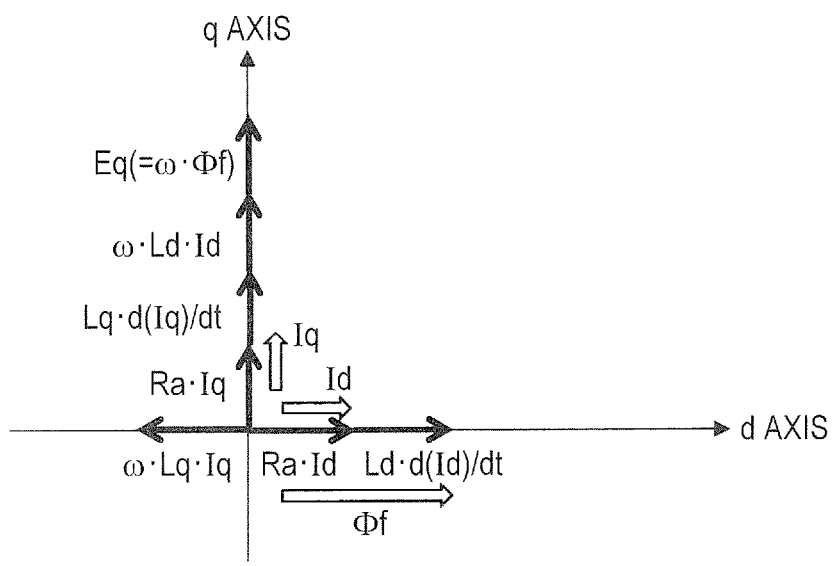
FIG. 5 is a vector diagram showing voltages applied to a d axis and a q axis of the motor.

Details of Step S104 in FIG. 3 are described now. FIG. 5 is a vector diagram showing voltages applied to the d axis and the q axis of the motor. Voltage equations on the d axis and q axis of the motor MT (brushless DC motor) are described as Equations (3) and (4), respectively, as apparent from the equivalent circuit shown in FIG. 2 and the vector diagram shown in FIG. 5. "ω" is an angular frequency of the motor MT, and "Φf" is an induced voltage constant, which indicates a magnetic flux of the rotor RT.

$$Vd = Ra \cdot Id + Ld \cdot d(Id)/dt - \omega \cdot Lq \cdot Iq \tag{3}$$

$$Vq = Ra \cdot Iq + Lq \cdot d(Iq)/dt + \omega(Ld \cdot Id + \Phi f) \tag{4}$$

When the rotor RT is at rest, the angular frequency (rotational speed) ω is zero and Equations (3) and (4) can be simplified to Equations (5) and (6), respectively.

$$Vd = Ra \cdot Id + Ld \cdot d(Id)/dt \tag{5}$$

$$Vq = Ra \cdot Iq + Lq \cdot d(Iq)/dt \tag{6}$$

By discretizing Equations (5) and (6) by the Euler method, differential equations as indicated by Equations (7) and (8) are obtained, respectively. "Ts" is a control cycle (in other words, sampling cycle).

$$Id(k) = \frac{\frac{Ld}{Ts}}{\frac{Ld}{Ts} + Ra} Id(k-1) + \frac{1}{\frac{Ld}{Ts} + Ra} Vd(k-1) \tag{7}$$

$$Iq(k) = \frac{\frac{Lq}{Ts}}{\frac{Lq}{Ts} + Ra} Iq(k-1) + \frac{1}{\frac{Lq}{Ts} + Ra} Vq(k-1) \tag{8}$$

Equations (7) and (8) can be converted to Equations (9) and (10), respectively, using Equation (11).

$$Yd(k) = \theta d^T \varphi d(k) \tag{9}$$

$$Yq(k) = \theta q^T \varphi q(k) \tag{10}$$

$$\left. \begin{array}{c} Yd(k) = Id(k) \quad Yq(k) = Iq(k) \\ \theta d^T = [A \ B] \quad \theta q^T = [C \ D] \\ \varphi d(k) = \begin{bmatrix} Id(k-1) \\ Vd(k-1) \end{bmatrix} \quad \varphi q(k) = \begin{bmatrix} Iq(k-1) \\ Vq(k-1) \end{bmatrix} \\ A = \frac{\frac{Ld}{Ts}}{\frac{Ld}{Ts} + Ra} \quad B = \frac{1}{\frac{Ld}{Ts} + Ra} \quad C = \frac{\frac{Lq}{Ts}}{\frac{Lq}{Ts} + Ra} \quad D = \frac{1}{\frac{Lq}{Ts} + Ra} \end{array} \right\} \tag{11}$$

The recursive least squares computer RLSC estimates, as indicated by Equations (9) and (11), the d-axis current (Id[k]) of the present control cycle using the d-axis current (Id[k−1]) and the d-axis target voltage (Vd[k−1]) of the previous control cycle as input signals, and updates the parameters A, B so that the error between the estimated d-axis current and an actually detected d-axis current draws closer to zero. In the first embodiment, as shown in FIG. 1, the current Id1 and the voltage Vd1 are used as the d-axis current (Id[k−1], Id[k]) and the d-axis target voltage (Vd [k−1]) in the above process. Moreover, though not shown in FIG. 1, as indicated by Equations (10) and (11), the recursive least squares computer RLSC can also update parameters C, D by performing the same processing on the q axis as the case of the d axis.

For updating such parameters, a computing equation indicated by Equation (12) is used. Equation (12) is a parameter identification equation employing repetitive calculations, and updates "θ(N)" every time "Y(k)" and "φ(k)" are input thereafter by providing "θ$_0$" and "P$_0$" as initial values. To provide the initial values, "θ$_0$" is set to zero and a diagonal matrix having sufficiently large positive values as diagonal elements is suitable for "P$_0$". It is to be noted that "λ" included in "P(N)" is a weighting factor referred to as a forgetting factor and allowing for forgetting unnecessary data from the past exponentially. As "λ" becomes smaller than 1, the forgetting speed increases and response characteristics of the parameter matrix can be improved. In this manner, the recursive least squares computer RLSC recursively computes the parameters A, B (as well as C, D) included in the parameter matrix "θ$_d^T$" (and "θ$_q^T$").

$$\left. \begin{array}{l} \theta(N) = \theta(N-1) + \dfrac{P(N-1)\varphi(N)}{\lambda + \varphi^T(N)P(N-1)\varphi(N)} \varepsilon(N) \\ \varepsilon(N) = Y(N) - \varphi^T(N)\theta(N-1) \\ P(N) = \dfrac{1}{\lambda}\left\{ P(N-1) + \dfrac{P(N-1)\varphi(N)\varphi^T(N)P(N-1)}{\lambda + \varphi^T(N)P(N-1)\varphi(N)} \right\} \end{array} \right\} \quad (12)$$

The motor constant computer LRC can obtain the motor constant of the d axis (resistance component Ra and d-axis inductance component Ld) using Equation (13) and the parameters A, B as inputs. Furthermore, the motor constant computer LRC can also obtain the motor constant of the q axis (resistance component Ra and q-axis inductance component Lq) using Equation (14) and the parameters C, D as inputs, though not shown in FIG. 1.

$$Ra=(1-A)/B \quad Ld=(A/B)\times Ts \quad (13)$$

$$Ra=(1-C)/D \quad Lq=(C/D)\times Ts \quad (14)$$

<<Configuration and Problem of Motor System (Comparison Example)>>

Figure 17:
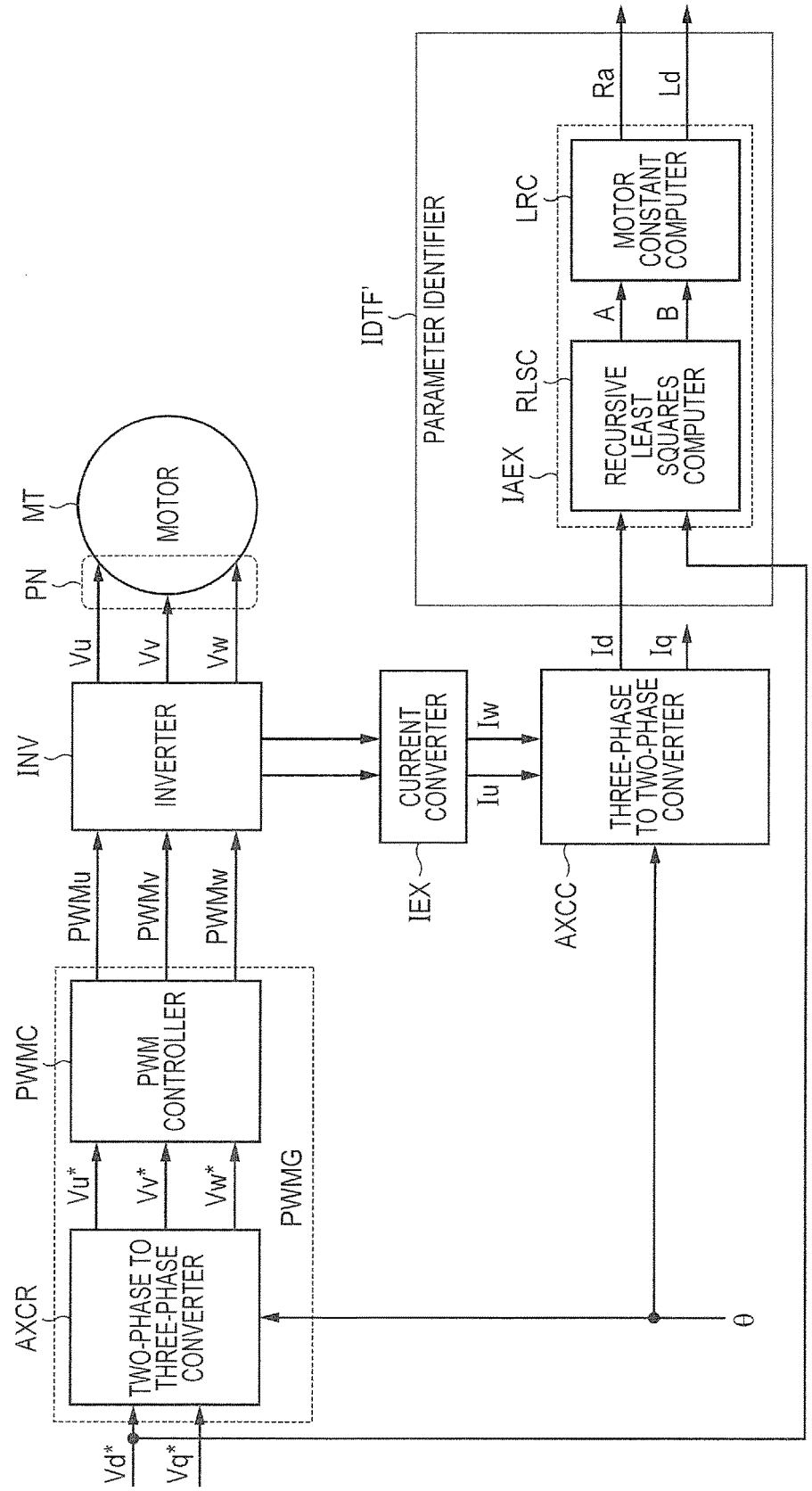
FIG. 17 is an outline diagram showing an example configuration of the motor system according to a comparison example of the invention.

FIG. 17 is an outline diagram showing an example configuration of the motor system according to a comparison example of the invention. The motor system shown in FIG. 17 is different from the motor system shown in FIG. 1 in that the offset setting unit OFSET and subtractors SBi, SBv are not arranged in a parameter identifier IDTF'. This allows the identification algorithm execution unit IAE in the parameter identifier IDTF' to identify the motor constant using the d-axis current Id and the d-axis target voltage Vd* as inputs.

Figure 18:
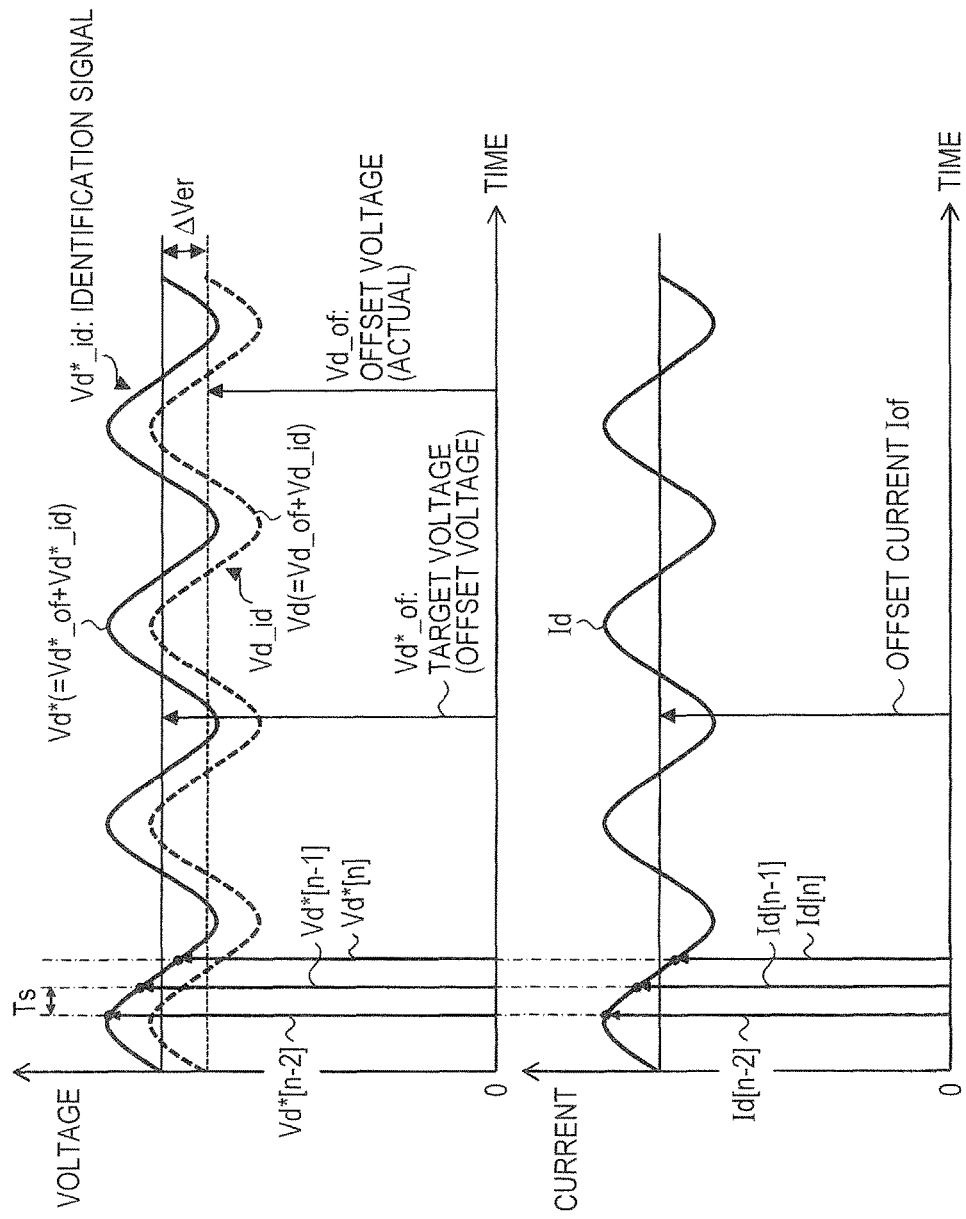
FIG. 18 is a diagram schematically showing an example of a signal input to the identification algorithm execution unit inn the motor system shown in FIG. 17.

FIG. 18 is a diagram schematically showing an example of a signal input to the identification algorithm execution unit in the motor system shown in FIG. 17. As shown in FIG. 18, in a case where the d-axis target voltage Vd* is set as the offset voltage Vd*_of to be the DC component, drive voltage Vd (−Vd_of) decreased from the offset voltage Vd*_of by a voltage error ΔVer may be applied to the external terminal PN of the motor MT. The voltage error ΔVer is caused mainly by a balance between a parasitic resistance component in a path (such as various wirings) from the output of the PWM signal generator PWMG to the external terminal PN and the resistance component (Ra) of the motor MT. It is to be noted that the drive voltage Vd is actually converted to the drive voltages of the three phases V (u, v, w) and thereafter applied to the external terminal PN.

On the other hand, in a case where the d-axis target voltage Vd* is set as the identification signal Vd*_id to be the AC component, the drive voltage Vd(=Vd_id) having an amplitude substantially equal to that of the identification signal Vd*_id is applied to the external terminal PN. The amplitude of the drive voltage Vd(=Vd_id) to be the AC component is determined mainly by a balance between the parasitic resistance component in the path from the output of the PWM signal generator PWMG to the external terminal PN and the resistance component (Ra, Ld) of the motor MT sufficiently larger than the parasitic impedance component.

The parameter identifier IDTF' shown in FIG. 17 identifies, as shown in FIG. 18, the motor constant by the recursive least squares method using the d-axis target voltage Vd* ( . . . , [n−2], [n−1], [n], . . . ) and the d-axis current Id ( . . . , [n−2], [n−1], [n], . . . ) with respect to each control cycle Ts. In this case, however, because the drive voltage Vd actually applied to the motor MT includes the voltage error ΔVer with respect to the d-axis target voltage Vd*, an error may occur to the motor constant to be identified. As a simple example, in a case where the correct resistance component is 10Ω, a current of 1 A is supposed to flow when a voltage of 10 V is applied. However, when the actual drive voltage Vd is 9 V against the d-axis target voltage Vd* of 10 V, the detected d-axis current Id is 0.9 A. The parameter identifier IDTF' identifies the resistance component as 11.1Ω based on 10 V and 0.9 A. This can lead to an error in the detected resistance component.

<<Main Effects of First Embodiment>>

Figure 6:
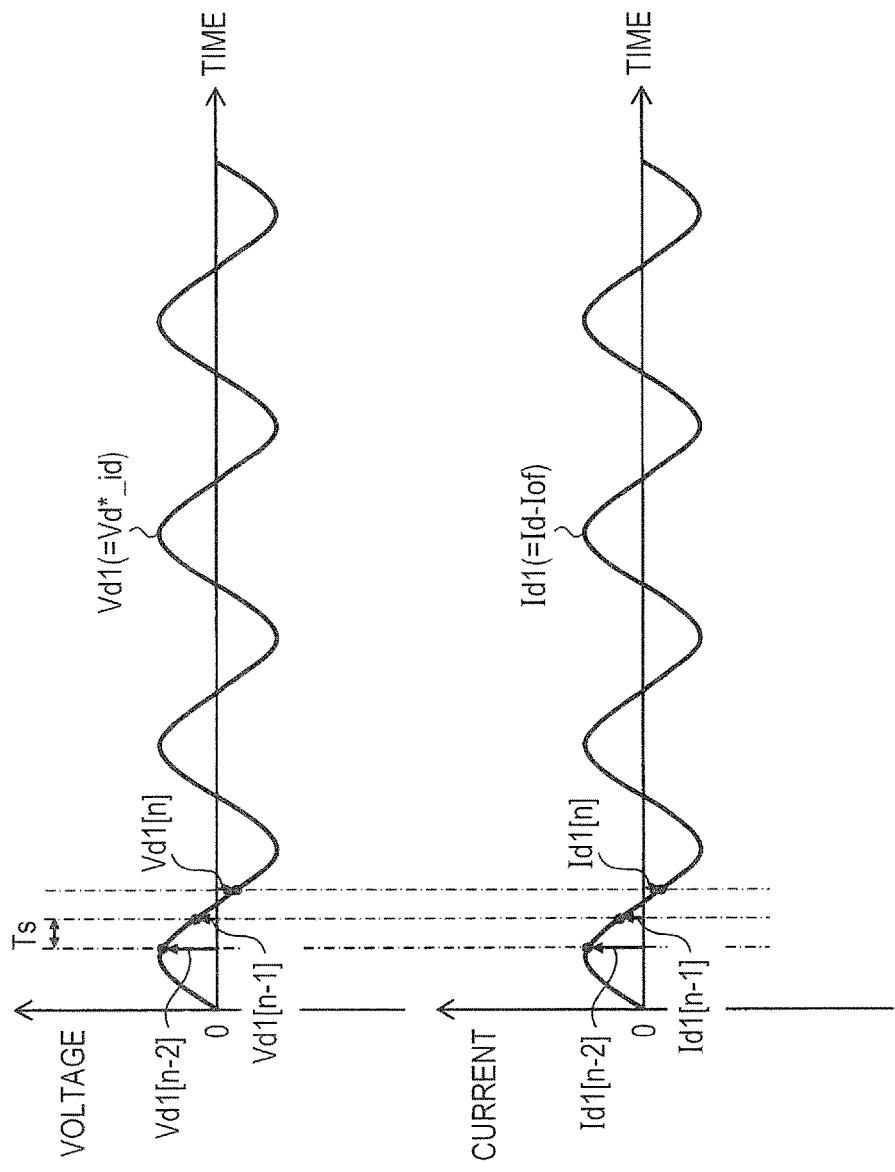
FIG. 6 is a diagram schematically sowing an example of a signal input to an identification algorithm execution unit in the motor system shown in FIG. 1.

FIG. 6 is a diagram schematically sowing an example of a signal input to the identification algorithm execution unit in the motor system shown in FIG. 1. As shown in FIG. 6, the voltage Vd1 resulting from subtraction of the offset voltage Vd*_of from the d-axis target voltage Vd* shown in FIG. 18 (only the identification signal Vd*_id to be the AC component) and the current Id1 resulting from subtraction of the offset current Iof from the d-axis current Id shown in FIG. 18 (only the AC component) are input to the parameter identifier IDTFa shown in FIG. 1. This makes it possible to improve identification precision of the motor constant to eliminate influence by the voltage error ΔVer shown in FIG. 18. Accordingly, it is also possible to control the motor, such as the sensorless synchronous motor, with high precision.

Second Embodiment

<<Configuration and Operation of Motor System (Modification Example)>>

Figure 7:
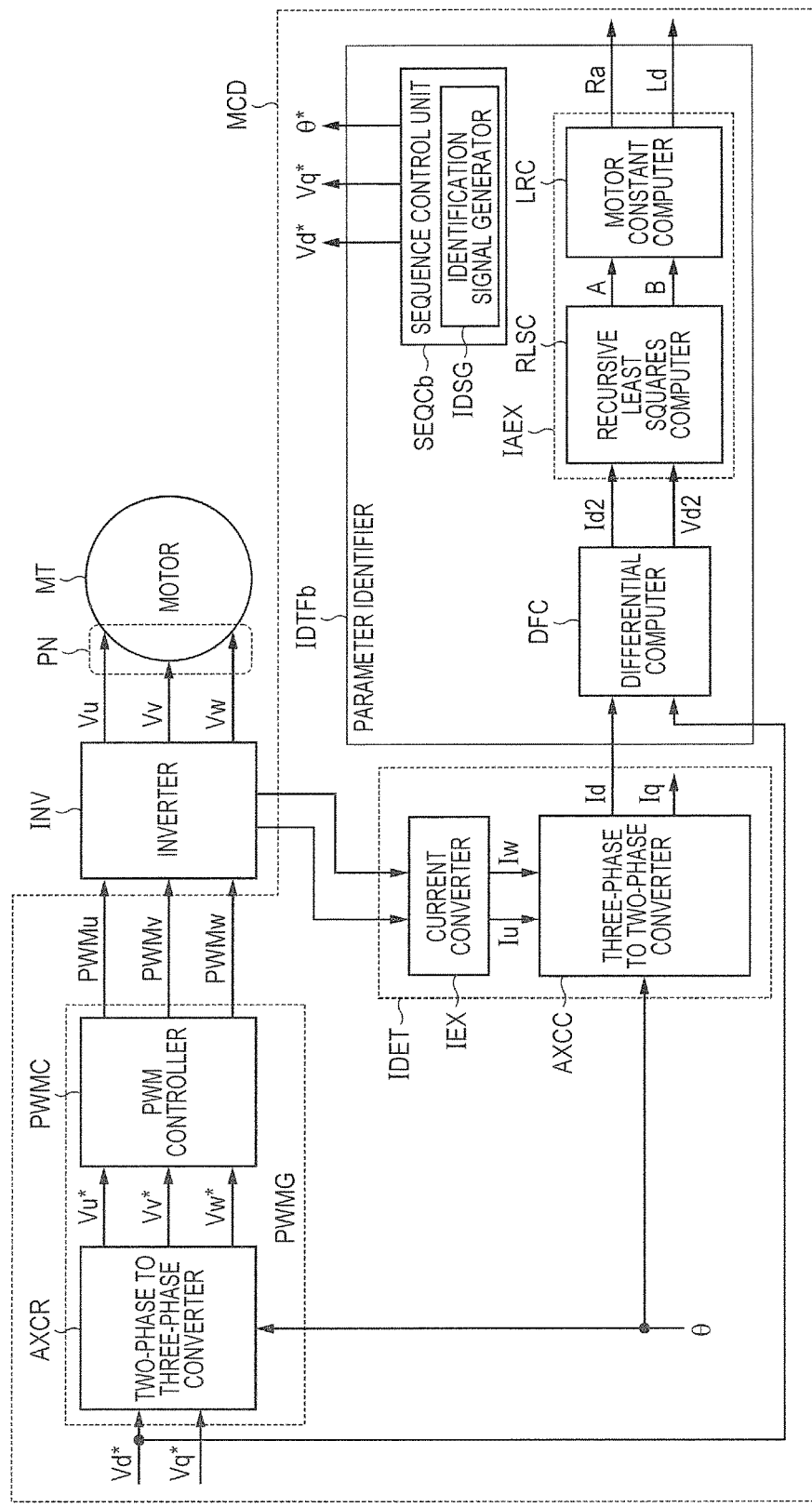
FIG. 7 is an outline diagram showing an example configuration of the motor system according to a second embodiment of the invention.

FIG. 7 is an outline diagram showing an example configuration of the motor system according to a second embodiment of the invention. The motor system shown in FIG. 7 is different from the example configuration shown in FIG. 1 in that the offset setting unit OFSET and the subtractors SBi, SBv are eliminated in the parameter identifier IDTFb and a differential computer DFC is provided instead. Accordingly, the processing details of a sequence control unit SEQCb in the parameter identifier IDTFb are also slightly different from those in the example configuration shown in FIG. 1. The differences are described below.

The differential computer DFC calculates the differential value between the value of the previous control cycle and the value of the present control cycle using the d-axis target voltage Vd* from the sequence control unit SEQCb and the d-axis current Id from the current detector IDET as inputs. Specifically, the differential computer DFC outputs a difference of the d-axis target voltage Vd* between the previous control cycle and the present control cycle as a voltage Vd2 and outputs a difference of the d-axis current Id between the previous control cycle and the present control cycle as the current Id2. The identification algorithm execution unit IAEX identifies the motor constant using the voltage Vd2 and the current Id2 as inputs.

Figure 8:
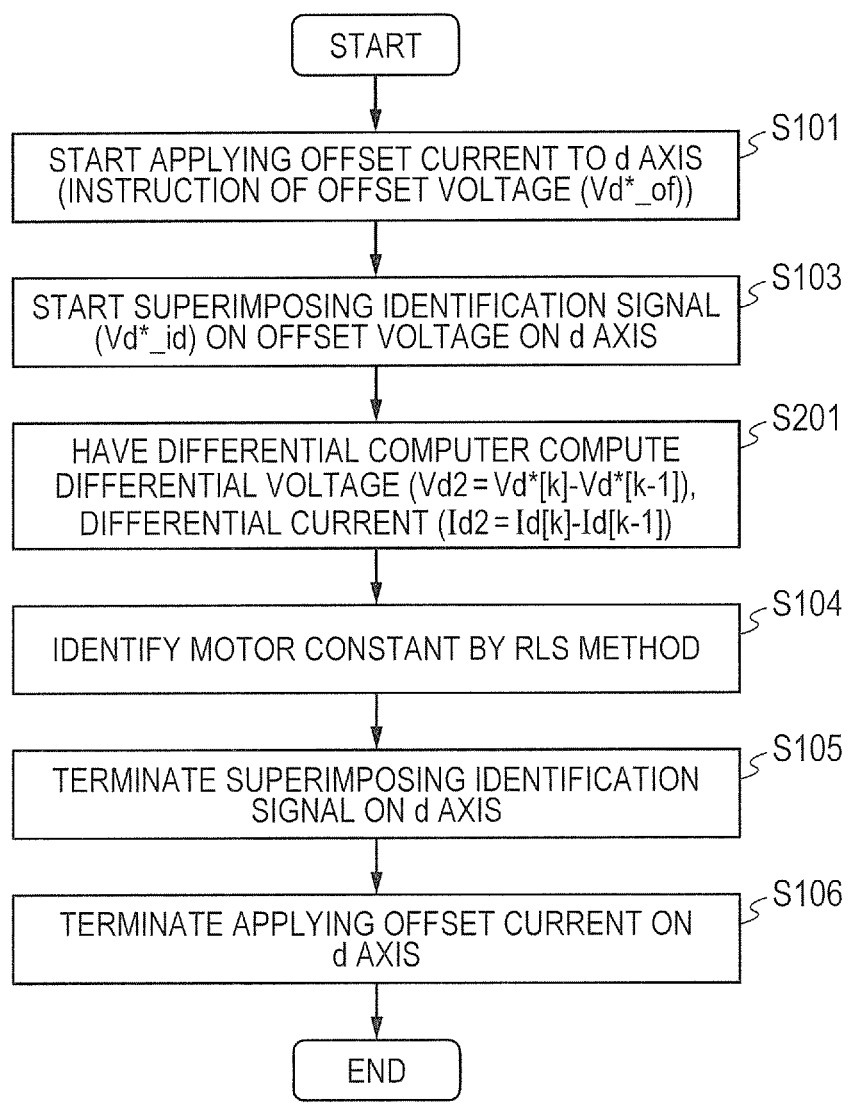
FIG. 8 is a flow diagram showing an example of processing details of the sequence control unit in the parameter identifier shown in FIG. 7.

FIG. 8 is a flow diagram showing an example of processing details of the sequence control unit in the parameter identifier shown in FIG. 7. The flow shown in FIG. 8 is different from the flow shown in FIG. 3 in that the processing by the offset setting unit at Step S102 is eliminated and Step S201 is added between Steps S103 and S104 instead. At Step S201, the sequence control unit SEQCb has the above-mentioned differential computer DFC perform computation.

<<Main Effects of Second Embodiment>>

Figure 9:
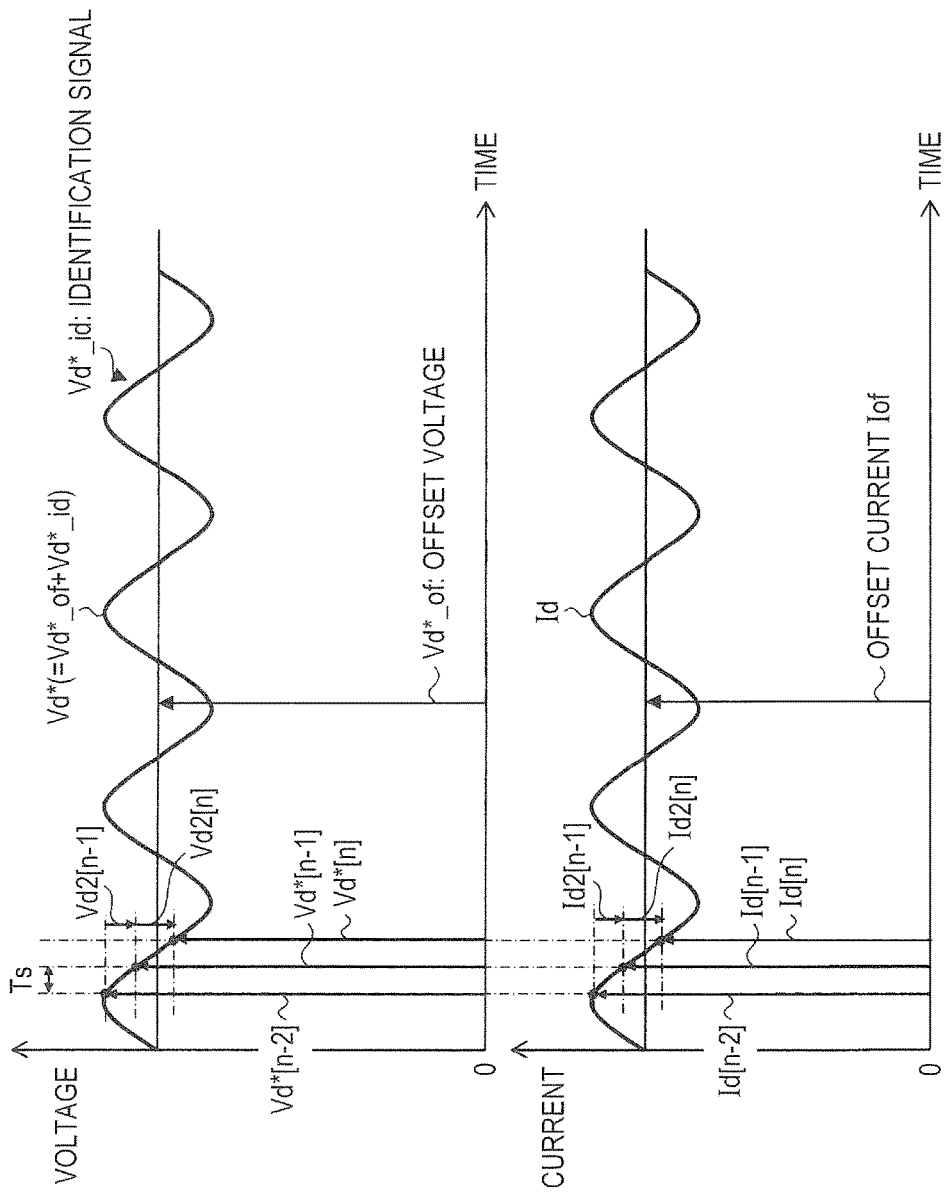
FIG. 9 is a diagram schematically sowing an example of a signal input to the identification algorithm execution unit in the motor system shown in FIG. 7.

FIG. 9 is a diagram schematically sowing an example of a signal input to the identification algorithm execution unit in the motor system shown in FIG. 7. The parameter identifier IDTFb shown in FIG. 7 identifies, as shown in FIG. 9, the motor constant by the recursive least squares method using the differential voltage Vd2 ( . . . , [n−1], [n], . . . ) of the d-axis target voltage Vd* in a control cycle Ts and the differential current Id2 ( . . . , [n−1], [n], . . . ) of the d-axis current Id in a control cycle Ts as inputs. For example, the differential voltage Vd2[n] is the differential value between the present d-axis target voltage Vd*[n] and the previous d-axis target voltage Vd*[n−1], and the differential current Id2[n] is the differential value between the present d-axis current Id[n] and the previous d-axis current Id[n−1].

Because use of such a method can also eliminate the influence by the voltage error ΔVer shown in FIG. 18 as in the case of the first embodiment, it is possible to improve the identification precision of the motor constant. Accordingly, it is also possible to control the motor, such as the sensorless synchronous motor, with high precision. Compared to the method of the first embodiment, however, an overall signal level of the signal input to the identification algorithm execution unit IAEX can be reduced as the control cycle Ts is shortened according to the differential value. As a result, an SN ratio (signal-to-noise ratio) of the input signal is reduced, which may cause degradation of the identification precision. Therefore, the method of the first embodiment is more preferable in this view.

Third Embodiment

<<Configuration and Operation of Motor System (Modification Example)>>

Figure 10:
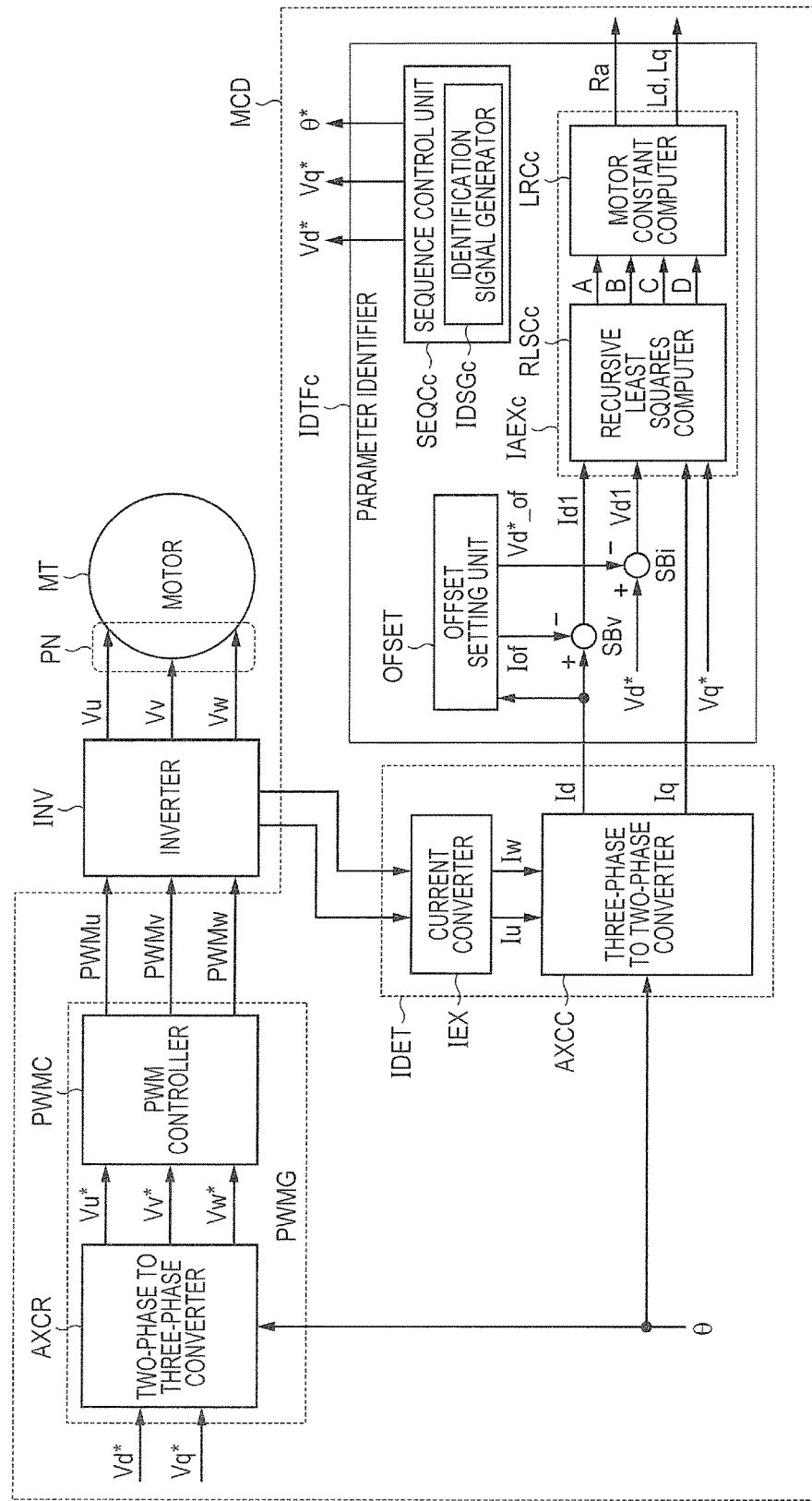
FIG. 10 is an outline diagram showing an example configuration of the motor system according to a third embodiment.

FIG. 10 is an outline diagram showing an example configuration of the motor system according to a third embodiment. The motor system shown in FIG. 10 is different from the example configuration shown in FIG. 1 in the configuration of the identification algorithm execution unit IAEXc in the parameter identifier IDTFc. Accordingly, an operation of the sequence control unit SEQCc is also slightly different. Furthermore, the motor MT herein is supposed to have the IPM structure. The identification algorithm execution unit IAEXc includes a recursive least squares computer RLSCc and a motor constant computer LRCc different from those in the example configuration shown in FIG. 1.

The recursive least squares computer RLSCc identifies the parameters A, B using the current Id1 and the voltage Vd1 as inputs as with the example configuration shown in FIG. 1. In addition, the recursive least squares computer RLSCc identifies the parameters C, D using the q-axis current Iq and the q-axis target voltage Vq* as inputs. That is, as described in the first embodiment, the recursive least squares computer RLSCc can identify the parameters C, D based on Equations (10) and (11). The motor constant computer LRCc calculates the resistance component Ra and the d-axis inductance component Ld of the motor MT based on Equation (13) using the parameters A, B as inputs, as with the example configuration shown in FIG. 1. In addition, the motor constant computer LRCc calculates the resistance component Ra and the q-axis inductance component Lq of the motor MT based on Equation (14) using the parameters C, D as inputs.

In order to identify such parameters C, D, the sequence control unit SEQCc (specifically, identification signal generator IDSGc) generates not only the identification signal Vd*_id for the d axis but also an identification signal (Vq*_id) for the q axis. Then, at Step S103 in FIG. 3, the sequence control unit SEQCc sets the superimposed signal (Vd*_of+Vd*_id) described above as the d-axis target voltage Vd* and sets the identification signal (Vq*_id) for the q axis similar to the identification signal Vd*_id for the d axis as the q-axis target voltage Vq*.

Figure 11:
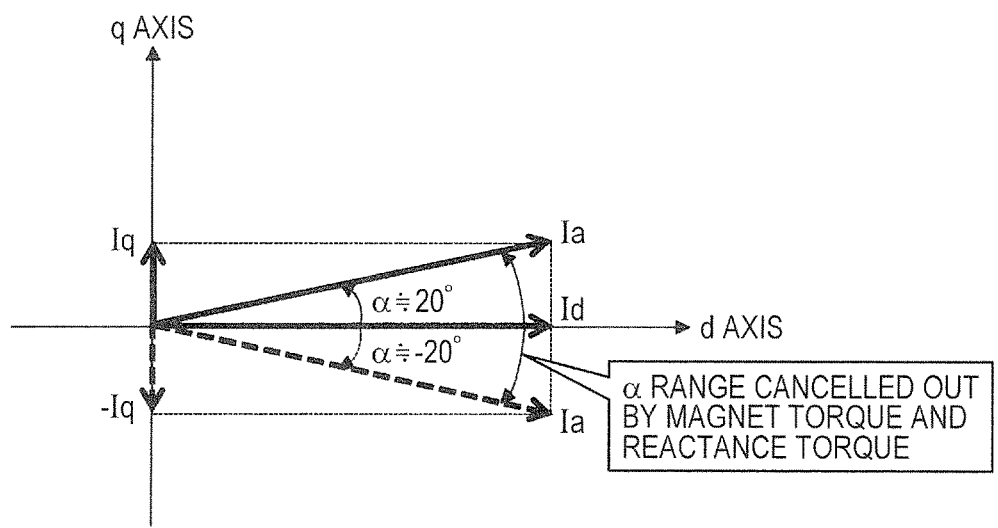
FIG. 11 is a vector diagram illustrating an example of torque characteristics in a motor having an IPM structure.

It is now concerned that, when the identification signal (Vq*_id) for the q axis is set, generated torque may vibrate the rotor RT and thereby reducing the identification precision. However, appropriately setting the amplitude of the identification signal (Vq*_id) for the q axis can suppress reduction of the identification precision. Specific explanation is given with reference to FIG. 11. FIG. 11 is a vector diagram illustrating an example of torque characteristics in the motor having the IPM structure.

A drive current Ia flowing through the motor MT is defined by the vector synthesis of the d-axis current Id and the q-axis current Iq. In the motor MT having the IPM structure, it is known that, when a current phase α(=tan−1 (Iq/Id)) of the drive current Ia is about −20° to +20°, magnet torque and reactance torque of the rotor RT cancel each other out and very little torque is generated. The d-axis current Id presents sufficiently large value because the offset current serving as the DC component is superimposed. Accordingly, even when the amplitude value of the identification signal (Vq*_id) for the q axis is defined so that the q-axis current Iq presents a substantially large value, it is possible to keep the current phase α about −20° to +20° and thus to perform identification in a state where the rotor RT is at rest.

<<Main Effects of Third Embodiment>>

As described above, by using the method of the third embodiment, the same effects as in the first embodiment can be obtained and additionally the q-axis inductance component Lq can be identified, whereby the method is applicable to the motor MT having the IPM structure.

Fourth Embodiment

<<Configuration of Motor System (Application Example)>>

Figure 12:
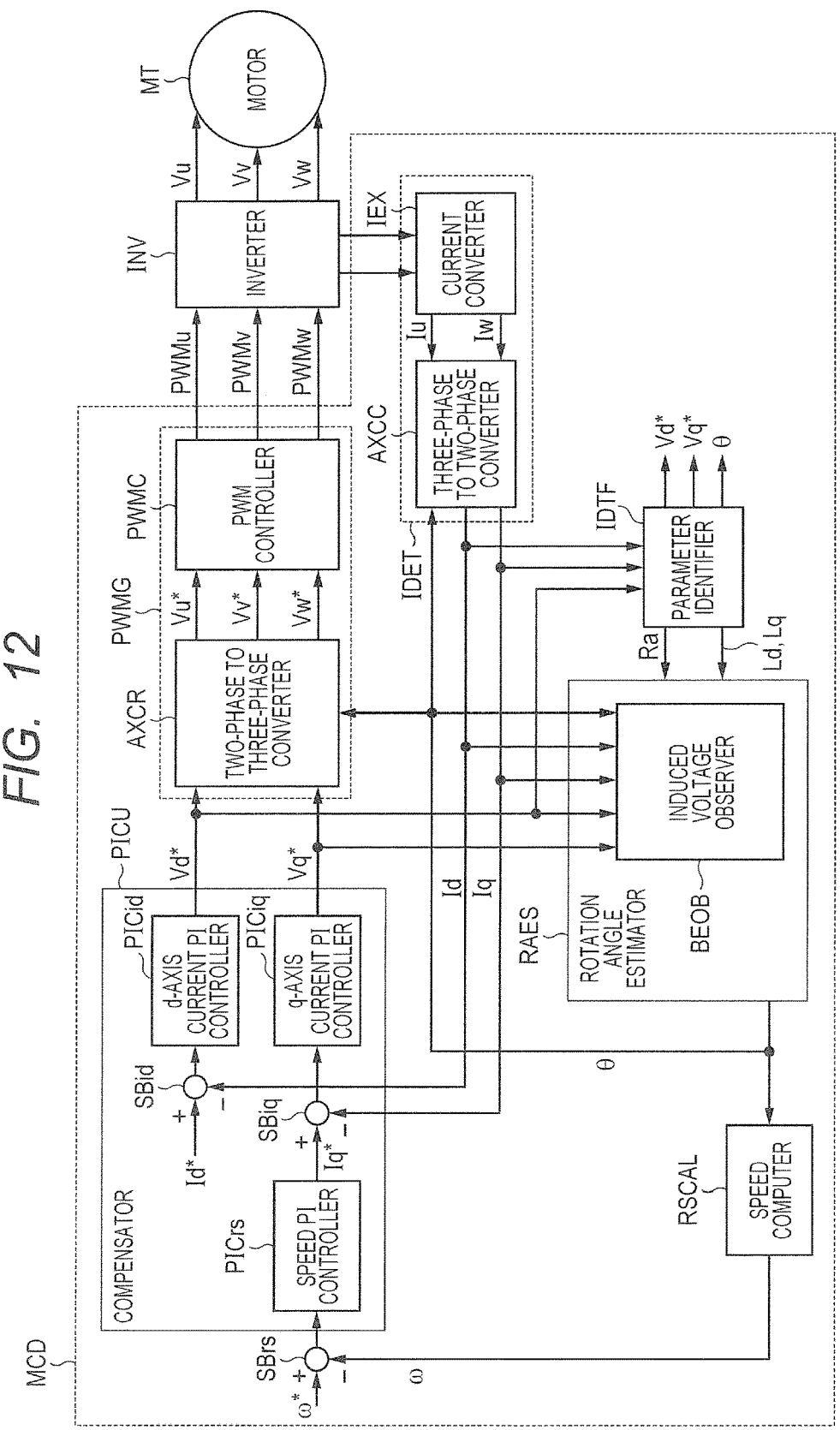
FIG. 12 is an outline diagram showing an example configuration of the motor system according to a fourth embodiment.

FIG. 12 is an outline diagram showing an example configuration of the motor system according to a fourth embodiment. The motor system shown in FIG. 12 includes, as with other example configurations shown in FIG. 1 and the like, the device MCD, the inverter INV, and the motor MT. The motor control device MCD is configured by, for example, a microcontroller, and includes a subtractor SBrs, a compensator PICU, the PWM signal generator PWMG, the current detector IDET, a parameter identifier IDTF, a rotation angle estimator RAES, and a speed computer RSCAL. The PWM signal generator PWMG and the current detector IDET have the same configurations as the example configurations shown in FIG. 1 and the like. The configurations described in the first to third embodiments are applied to the parameter identifier IDTF.

The rotation angle estimator RAES includes an induced voltage observer BEOB. The induced voltage observer BEOB calculates an induced voltage of the motor MT using the d-axis target voltage Vd* and the q-axis target voltage Vq*, the d-axis current Id and the q-axis current Iq detected by the current detector IDET, and the motor constant identified by the parameter identifier IDTF (resistance component Ra, d-axis inductance component Ld, q-axis inductance component Lq). The rotation angle estimator RAES then estimates the rotation angle θ of the rotor RT in the motor MT based on the calculated induced voltage.

The speed computer RSCAL computes the angular frequency (rotational speed) ω based on a change rate of the rotation angle θ from the rotation angle estimator RAES. The subtractor SBrs detects a speed error between a target rotational speed ω* and the rotational speed ω from the speed computer RSCAL. The compensator PICU includes a speed PI controller PICrs, a d-axis current PI controller PICid, a q-axis current PI controller PICiq, and subtractors SBid, SBiq.

The speed PI controller PICrs performs PI control (P: Proportion, I: Integration) in response to the speed error from the subtractor SBrs, and specifies a q-axis target current Iq* to bring the speed error closer to zero. The subtractor SBiq detects a q-axis current error between the q-axis target current Iq* and the q-axis current Iq from the current detector IDET. The q-axis current PI controller PICiq performs PI control in response to the q-axis current error and specifies the q-axis target voltage Vq* to bring the q-axis current error closer to zero.

The subtractor SBid detects a d-axis current error between the d-axis target current Id* and the d-axis current Id from the current detector IDET. The d-axis current PI controller PICid performs PI control in response to the d-axis current error and specifies the d-axis target voltage Vd* to bring the d-axis current error closer to zero. It is to be noted that, during normal operation of the motor MT, the d-axis target current Id* is set to zero, for example. The PWM signal generator PWMG operates in response to the d-axis target voltage Vd* and the q-axis target voltage Vq* from the compensator PICU.

In this manner, the position-sensorless motor system allows for estimating the rotation angle θ of the rotor RT by calculating the induced voltage using the rotation angle estimator RAES during the normal operation. Calculation of the induced voltage requires the motor constant. If the motor constant has an error, estimation accuracy of the rotation angle θ is reduced, leading to reduction of motor efficiency. Therefore, it is beneficial to identify the motor constant using the parameter identifier IDTF as described in the first to third embodiments prior to the normal operation of the motor MT.

<<Outline of Rotation Angle Estimator>>

Figure 13A:
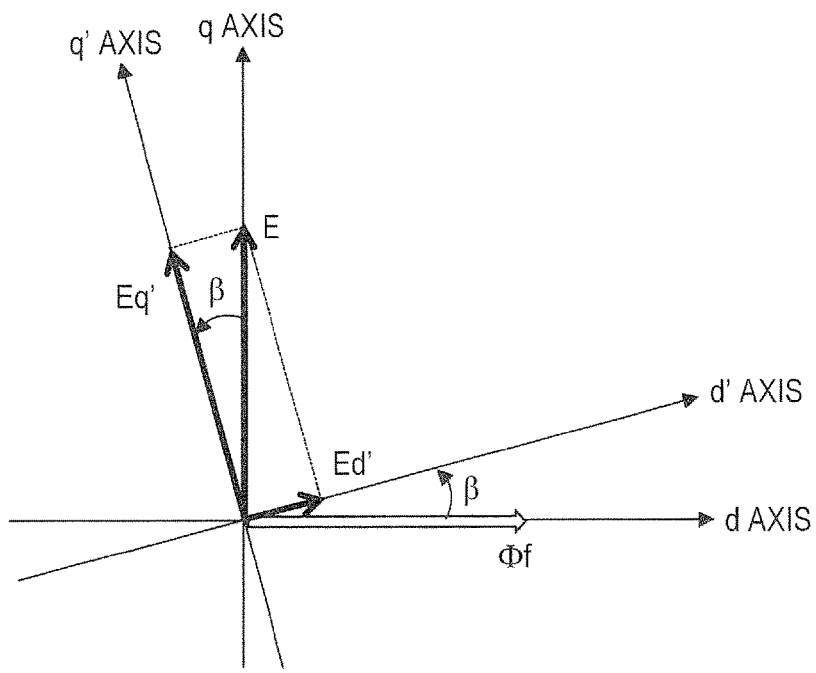
FIG. 13A is a vector diagram illustrating a basic operation of a rotation angle estimator shown in FIG. 12.
Figure 13B:
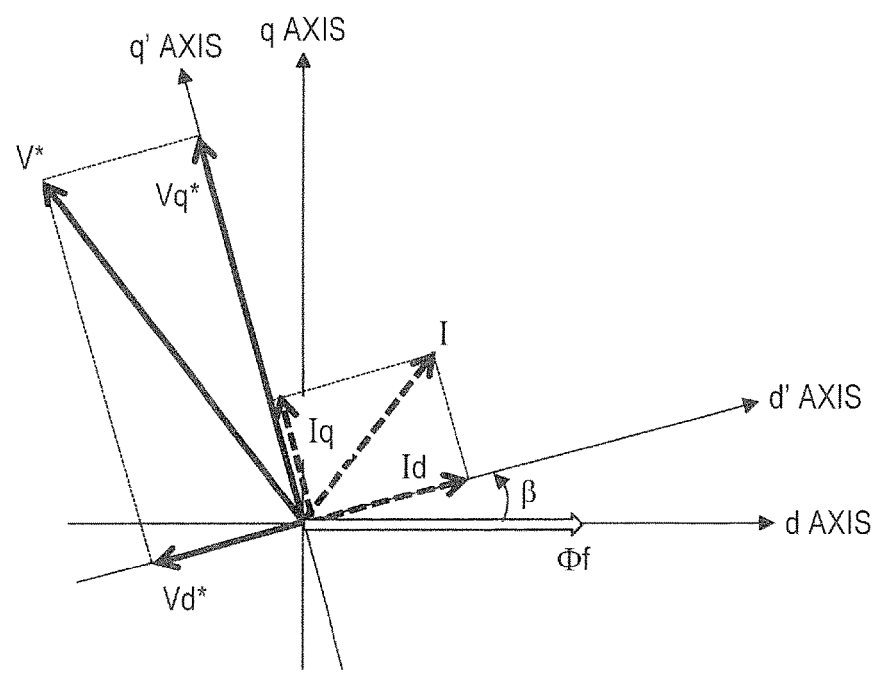
FIG. 13B is a vector diagram illustrating another basic operation of the rotation angle estimator shown in FIG. 12.

FIGS. 13A and 13B are vector diagrams illustrating basic operations of the rotation angle estimator shown in FIG. 12. As shown in FIG. 13A, the induced voltage E is generated on the q axis of the correct dq coordinate, which indicates zero on the d axis. However, if there is a phase error β between a d'q' coordinate recognized by the motor control device MCD and the correct dq coordinate, an induced voltage Ed' is observed on the d' axis. The rotation angle estimator RAES can obtain the correct dq coordinate by searching for a d'q' coordinate in which the induced voltage Ed' is zero, thereby allowing for estimation of the rotation angle θ with high precision.

Specifically, the voltage equations for the d' axis and the q' axis are represented by Equations (15) and (16). As shown in FIG. 13, "Vd*'" and "Vq*'" are a d'-axis target voltage and a q'-axis target voltage, respectively, and "Id" and "Iq" are a d' axis current and a q' axis current, respectively. "ω*" is target rotational speed, and "Ed'" and "Eq'" are a d' axis induced voltage and a q' axis induced voltage, respectively. "s" is a differential operator (Laplace operator).

$$Vd^{*}=Ra \cdot Id+s \cdot Ld \cdot Id-\omega^{*} \cdot Lq \cdot Iq+Ed' \quad (15)$$

$$Vq^{*}=Ra \cdot Iq+s \cdot Lq \cdot Iq+\omega^{*} \cdot Ld \cdot Id+Eq' \quad (16)$$

The induced voltages Ed', Eq' are calculated on the basis of Equations (15) and (16). The calculations require various motor constants. Moreover, the phases of the induced voltage E and the induced voltage E (in other words, as shown in FIG. 13A, the phase error β between the dq coordinate and the d'q' coordinate) is calculated on the basis of Equations (17) and (18) using the calculation results. The rotation angle θ can take the correct value by controlling it so that the phase error β is converged to zero.

$$E=\sqrt{\{(Ed')2+(Eq')2\}} \quad (17)$$

$$\beta = \tan^{-1}(Ed'/Eq') \quad (18)$$

<<Configuration of Rotation Angle Estimator>>

Figure 14:
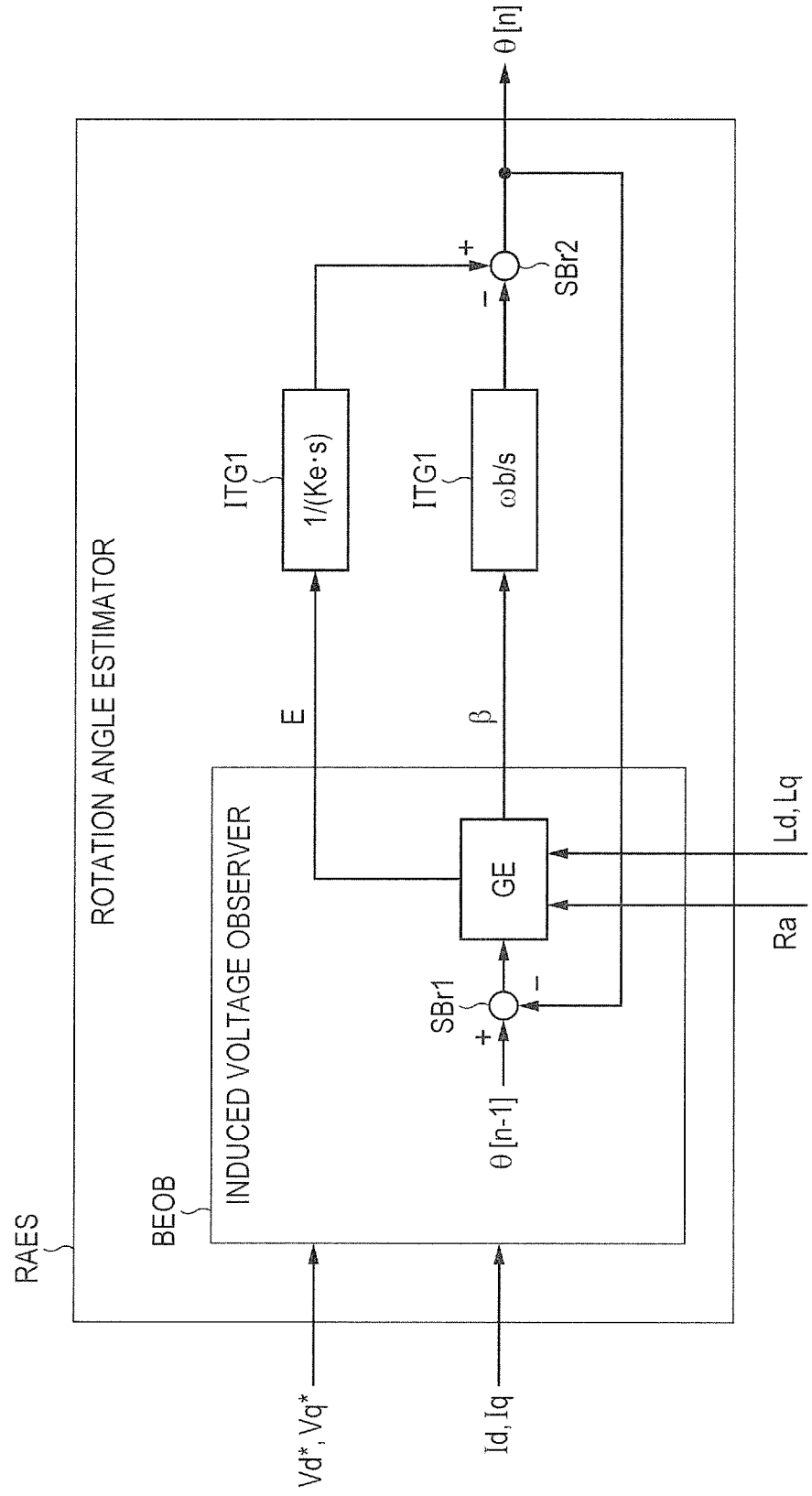
FIG. 14 is a conceptual diagram showing a schematic example configuration of the rotation angle estimator shown in FIG. 12.

The rotation angle estimator RAES can be achieved with various configurations based on the above-mentioned basic operation, such as the example configuration shown in FIG. 14. FIG. 14 is a conceptual diagram showing a schematic example configuration of the rotation angle estimator shown in FIG. 12. The rotation angle estimator RAES shown in FIG. 14 includes the induced voltage observer BEOB, integrators ITG1, ITG2, and a subtractor SBr2. The induced voltage observer BEOB includes a subtractor SBr1 and a gain setting unit GE. The induced voltage observer BEOB estimates the induced voltage E of represented by Equation (17) and the phase error β represented by Equation (18) in response to the d-axis target voltage Vd* and the q-axis target voltage Vq* and the d-axis current Id and the q-axis current Iq.

A control loop including the subtractors SBr1, SBr2, the gain setting unit GE, and the integrator ITG2 generates the present rotation angle θ[n] so that the phase error β converges to zero, while keeping the differential value between the present rotation angle θ[n] and the previous rotation angle θ[n−1] at an output value from the integrator ITG1. The output value from the integrator ITG1 is obtained by integrating the rotational speed (ω) obtained by multiplying the induced voltage E by a predetermined coefficient "1/Ke", and indicates the target differential value between the present rotation angle θ[n] and the previous rotation angle θ[n−1].

Figure 15A:
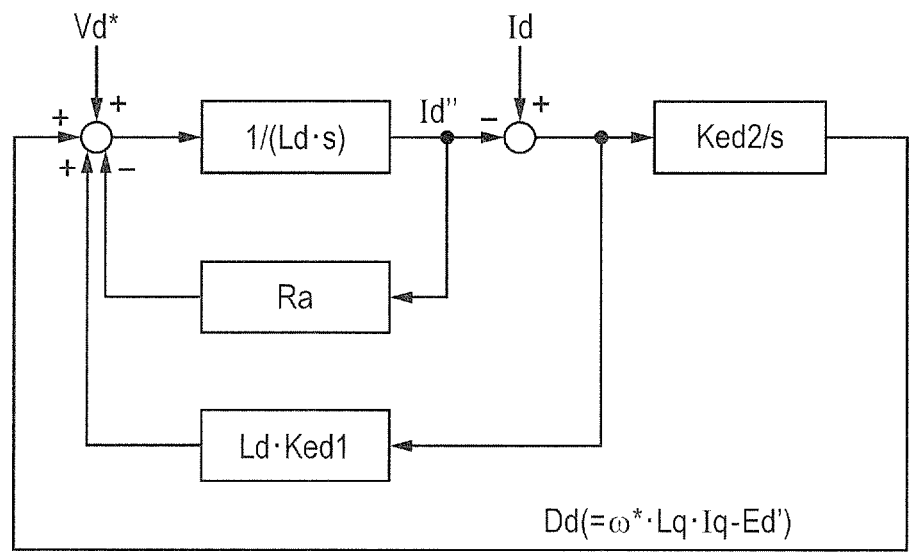
FIG. 15A is a block diagram showing an example configuration of a main part of a gain setting unit shown in FIG. 14.
Figure 15B:
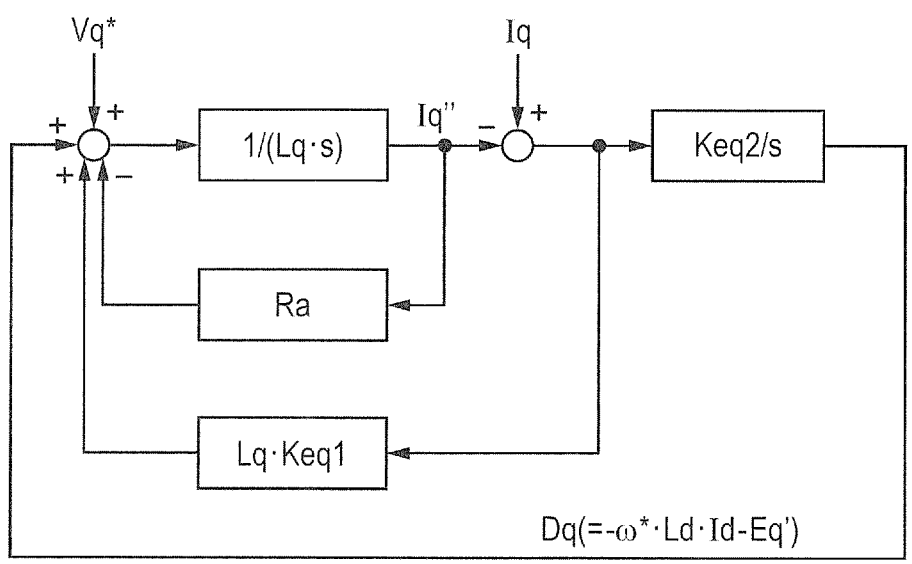
FIG. 15B is a block diagram showing another example configuration of a main part of a gain setting unit shown in FIG. 14.

FIGS. 15A and 15B are block diagrams showing example configurations of a main part of the gain setting unit shown in FIG. 14. With the example configuration shown in FIG. 15A, "−ω*·Lq·Iq+Ed'" is assumed as "−Dd", and "Dd (=ω*·Lq·Iq−Ed')" included in Equation (15) is calculated by the control loop using the d-axis target voltage Vd* and the d-axis current Id as inputs. Similarly, with the example configuration shown in FIG. 15B, "ω*·Ld·Id+Eq'" included in Equation (16) is assumed as "−Dq", and "Dq(=−ω*·Ld·Id−Eq')" is calculated by the control loop using the q-axis target voltage Vq* and the q-axis current Iq as inputs.

When "Dd" and "Dq" are calculated, the d' axis induced voltage Ed' and the q' axis induced voltage Eq' are calculated, and the induced voltage E and the phase error β are calculated on the basis of Equations (17) and (18). Each of the example configurations shown in FIGS. 15A and 15B includes the resistance component Ra, the d-axis inductance component Ld, and the q-axis inductance component Lq of the motor MT. Furthermore, each gain Ked1, Ked2, Keq1, and Keq2 that specifies frequency characteristics of each control loop can be specified as the optimum value by using the resistance component Ra, the d-axis inductance component Ld, and the q-axis inductance component L. Thus, it is beneficial to define the motor constant with high precision using the parameter identifier IDTF described in the first to third embodiments.

<<Method of Determining Offset Voltage Value and Amplitude Value of Identification Signal>>

Figure 16:
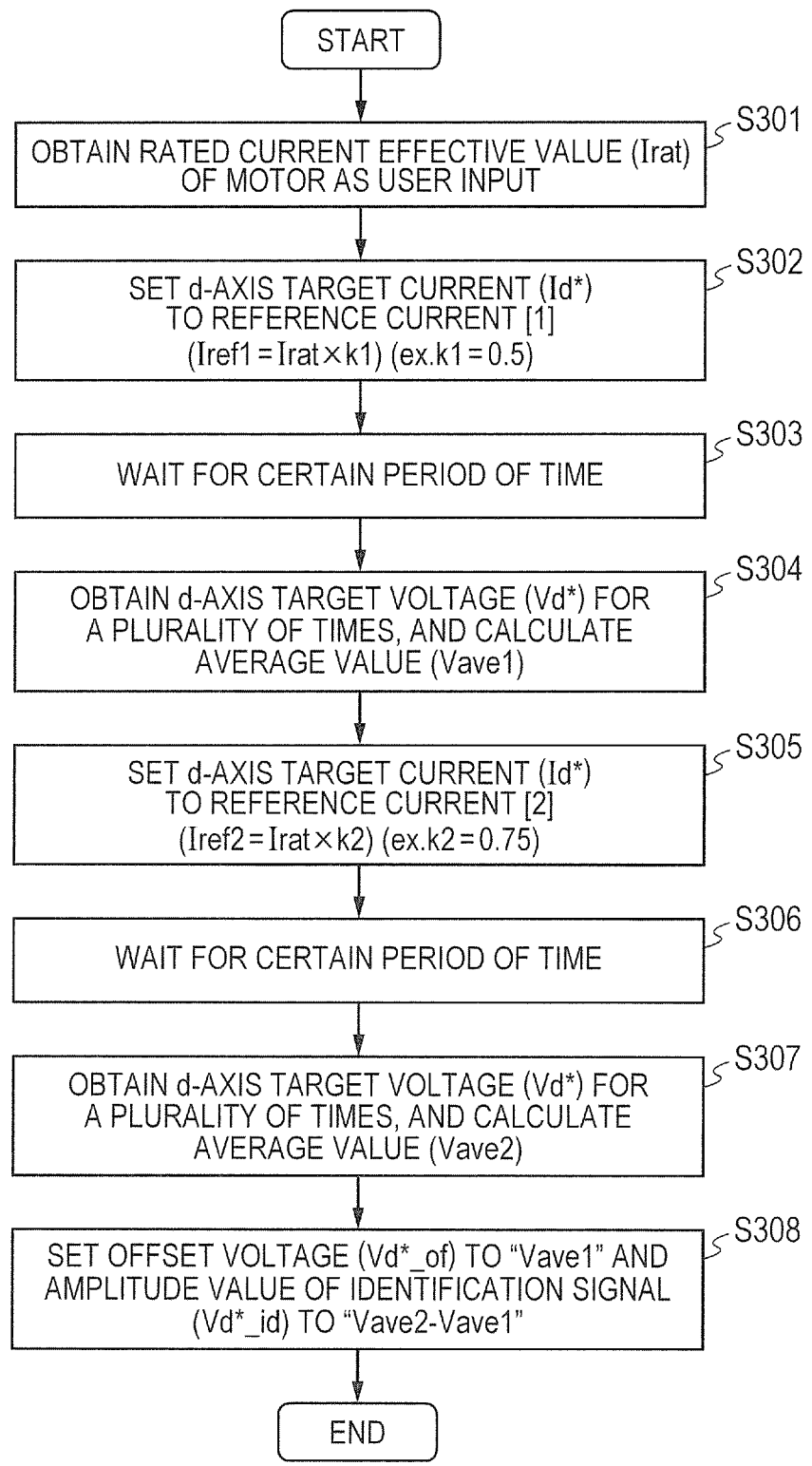
FIG. 16 is a flow diagram showing an example of a method of determining an offset voltage value and an amplitude value of an identification signal in the motor control device shown in FIG. 12.

FIG. 16 is a flow diagram showing an example of a method of determining an offset voltage value and an amplitude value of an identification signal in the motor control device shown in FIG. 12. As described in the first embodiment, the value of the offset voltage Vd*_of and the amplitude value of the identification signal Vd*_id used by the parameter identifier IDTF can be determined on the basis of Equations (1) and (2). The method of determining these values using the current control loop included in the motor control device MCD shown in FIG. 12 is described below.

In FIG. 16, the motor control device MCD firstly obtains the rated current effective value Irat of the motor MT to be used as a user input (Step S301). Then, in a state where the speed PI controller PICrs is stopped, the motor control device MCD sets the q-axis target current Iq* to zero and the d-axis target current Id* to the reference current Iref1 obtained by Equation (1) (Step S302), and waits for a certain period of time (Step S303). During the certain period of time, the d-axis target voltage Vd* gradually increases along with the control by the d-axis current PI controller PICid, and the d-axis current Id converges to the reference current Iref1. The motor control device MCD then obtains the d-axis target voltage Vd* for a plurality of times, and calculates an average value Vave1 thereof (Step S304).

Subsequently, as with the reference current Iref1, the motor control device MCD alters the d-axis target current Id* to the reference current Iref2 obtained by Equation (2) (Step S305), and waits for a certain period of time (Step S306). Accordingly, the d-axis target voltage Vd* gradually increases, and the d-axis current Id converges to the reference current Iref2. The motor control device MCD obtains the d-axis target voltage Vd* for a plurality of times, and calculates an average value Vave2 thereof (Step S307). The motor control device MCD then sets the offset voltage Vd*_of to "Vave1" and the amplitude value of the identification signal Vd*_id to "Vave2−Vave1" (Step S308). Subsequently, the motor control device MCD identifies the motor constant using the set values in a state where the d-axis current PI controller PICid and the q-axis current PI controller PICiq are stopped.

It is to be noted that the identified motor constant may be reflected to not only the rotation angle estimator RAES but the current control loop or the like. Specifically, the identified motor constant can be used for setting a frequency band for the compensator PICU (setting PI control parameters) and the like. Even in such a case, the flow shown in FIG. 16 can be performed by, for example, setting a temporary motor constant (such as a design value) in the compensator PICU. Alternatively, as described with reference to FIG. 3 in the first embodiment, by using the method of directly increasing the d-axis target voltage Vd*, it is possible to appropriately set the value of the offset voltage Vd*_of and the amplitude value of the identification signal Vd*_id without using the flow shown in FIG. 16 (e.g. even when the current control loop cannot be used).

<<Main Effects of Fourth Embodiment>>

As described above, by using the motor system of the fourth embodiment, it is possible to estimate the location of the rotor RT in the motor MT with high precision in addition to various effects described in the first to third embodiments. This results in improvement of the motor efficiency and the like.

Although the invention made by the inventors are specifically described with reference to the embodiments, the invention is not limited to the embodiments but various modifications may be made without departing from the scope of the invention. For example, the above-mentioned embodiments are detailed to comprehensively describe the invention and not necessarily limited to include all the configurations described above. A part of a configuration of one embodiment can be replaced by a configuration of another embodiment, and a configuration of one embodiment can be added to a configuration of another embodiment. A part of the configuration of each embodiment can be added to, deleted from, or replaced by another configuration.

For example, although the motor constant is identified herein by directly setting the d-axis target voltage Vd*, with such an example configuration as shown in FIG. 12, it is also possible to identify the motor constant by indirectly setting the d-axis target voltage Vd* through the setting of the d-axis target current Id*. In this case, the offset current is set by the d-axis target current Id*, and the offset setting unit OFSET records the d-axis target voltage Vd* at the time as the offset voltage Vd*_of.

What is claimed is:

1. A motor control device that controls a motor by vector control, comprising:
    a PWM signal generator that generates a PWM (Pulse Width Modulation) signal for each phase of the motor based on a d-axis target voltage and a q-axis target voltage;
    a current detector that detects each phase current of the motor and detects a d-axis current and a q-axis current of the motor based on the each phase current; and
    an identifier that identifies a motor constant of the motor, wherein the identifier performs:
    a first processing of setting an offset voltage of a DC component as a first d-axis target voltage;
    a second processing of detecting as an offset current the d-axis current that flows according to the setting of the first d-axis target voltage using the current detector;
    a third processing of setting a voltage resulting from superimposing an identification signal of an AC component specified in advance on the first d-axis target voltage as a second d-axis target voltage;
    a fourth processing of detecting the d-axis current that flows according to the setting of the second d-axis target voltage using the current detector, and
    a fifth processing of identifying the motor constant by a predetermined identification algorithm using a voltage obtained by subtracting the first d-axis target voltage from the second d-axis target voltage and a current obtained by subtracting the offset current from the d-axis current detected in the fourth processing as inputs.

2. The motor control device according to claim 1, wherein the predetermined identification algorithm is based on the recursive least squares method.

3. The motor control device according to claim 1, wherein the motor constant includes a resistance component of the motor and a d-axis inductance component of the motor.

4. The motor control device according to claim 1, wherein the identifier performs a sixth processing of increasing the d-axis target voltage until the d-axis current detected by the current detector reaches a predetermined reference current and specifying the d-axis target voltage at the time of reaching the reference current as a maximum value of the second d-axis target voltage, and
wherein the reference current is set to a value smaller than a rated current effective value of the motor that is already known.

5. The motor control device according to claim 1, further comprising:
a rotation angle estimator that calculates an induced voltage of the motor using the d-axis target voltage and the q-axis target voltage, the d-axis current and the q-axis current detected by the current detector, and the motor constant identified in the fifth processing, and estimates a rotation angle of a rotor in the motor based on the calculated induced voltage.

6. A motor control device that controls a motor by vector control, comprising:
a PWM signal generator that generates a PWM (Pulse Width Modulation) signal for each phase of the motor based on a d-axis target voltage and a q-axis target voltage;
a current detector that detects each phase current of the motor and detects a d-axis current and a q-axis current of the motor based on the each phase current; and
an identifier that identifies a motor constant of the motor, wherein the identifier performs:
a first processing of setting an offset voltage of a DC component as a first d-axis target voltage;
a second processing of sequentially setting a voltage resulting from superimposing an identification signal of an AC component specified in advance on the first d-axis target voltage as a second d-axis target voltage with respect to each predetermined control cycle;
a third processing of sequentially detecting the d-axis current that flows according to the setting of the second d-axis target voltage with respect to each control cycle using the current detector, and
a fourth processing of identifying the motor constant by a predetermined identification algorithm using a differential voltage between the second d-axis target voltages of the control cycle of this time and the control cycle of previous time and a differential current between the d-axis currents detected in the third processing of the control cycle of this time and the control cycle of previous time as inputs.

7. The motor control device according to claim 6, wherein the predetermined identification algorithm is based on the recursive least squares method.

8. The motor control device according to claim 6, wherein the motor constant includes a resistance component of the motor and a d-axis inductance component of the motor.

9. The motor control device according to claim 6, wherein the identifier performs a fifth processing of increasing the d-axis target voltage until the d-axis current detected by the current detector reaches a predetermined reference current and specifying the d-axis target voltage at the time of reaching the reference current as a maximum value of the second d-axis target voltage, and
wherein the reference current is set to a value equal to or smaller than a rated current effective value of the motor that is already known.

10. The motor control device according to claim 6, further comprising:
a rotation angle estimator that calculates an induced voltage of the motor using the d-axis target voltage and the q-axis target voltage, the d-axis current and the q-axis current detected by the current detector, and the motor constant identified in the fourth processing, and estimates a rotation angle of a rotor in the motor based on the calculated induced voltage.

11. A motor system comprising:
a motor;
a driver that applies a drive voltage to each phase of the motor based on a PWM (Pulse Width Modulation) signal; and
a motor control device that controls the motor by vector control,
wherein the motor control device comprises:
a PWM signal generator that generates the PWM signal based on a d-axis target voltage and q-axis target voltage;
a current detector that detects each phase current of the motor and detects a d-axis current and a q-axis current of the motor based on the each phase current; and
an identifier that identifies a motor constant of the motor, and
the identifier performs:
a first processing of setting an offset voltage of a DC component as a first d-axis target voltage;
a second processing of detecting as an offset current the d-axis current that flows according to the setting of the first d-axis target voltage using the current detector;
a third processing of setting a voltage resulting from superimposing an identification signal of an AC component specified in advance on the first d-axis target voltage as a second d-axis target voltage;
a fourth processing of detecting the d-axis current that flows according to the setting of the second d-axis target voltage using the current detector, and
a fifth processing of identifying the motor constant by a predetermined identification algorithm using a voltage obtained by subtracting the first d-axis target voltage from the second d-axis target voltage and a current obtained by subtracting the offset current from the d-axis current detected in the fourth processing as inputs.

12. The motor system according to claim 11, wherein the predetermined identification algorithm is based on the recursive least squares method.

13. The motor system according to claim 11, wherein the identifier performs a sixth processing of increasing the d-axis target voltage until the d-axis current detected by the current detector reaches a predetermined reference current and specifying the d-axis target voltage at the time of reaching the reference current as a maximum value of the second d-axis target voltage, and wherein the reference current is set to a value smaller than a rated current effective value of the motor that is already known.

14. The motor system according to claim 11, wherein the motor control device further comprises a rotation angle estimator that calculates an induced voltage of the motor using the d-axis target voltage and the q-axis target voltage, the d-axis current and the q-axis current detected by the current detector, and the motor constant identified in the fifth processing, and estimates a rotation angle of a rotor in the motor based on the calculated induced voltage estimator.

15. The motor system according to claim 11, wherein the motor control device comprises a microcontroller.

* * * * *